United States Patent [19]
Saito et al.

[11] Patent Number: 4,538,182
[45] Date of Patent: Aug. 27, 1985

[54] IMAGE PROCESSING APPARATUS

[75] Inventors: Seiji Saito, Yokosuka; Naoki Ayata, Machida; Hidetoshi Suzuki, Tokyo; Kunitaka Ozawa, Azumabashi; Noboru Koumura, Narashino, all of Japan

[73] Assignee: Canon Kabushiki Kaisha, Tokyo, Japan

[21] Appl. No.: 374,102

[22] Filed: May 3, 1982

[30] Foreign Application Priority Data

| May 11, 1981 | [JP] | Japan | 56-69316 |
| May 26, 1981 | [JP] | Japan | 56-78699 |
| May 27, 1981 | [JP] | Japan | 56-79292 |
| May 28, 1981 | [JP] | Japan | 56-80045 |
| Jun. 5, 1981 | [JP] | Japan | 56-85622 |
| Jun. 10, 1981 | [JP] | Japan | 56-88008 |
| Jun. 11, 1981 | [JP] | Japan | 56-88824 |
| Jun. 25, 1981 | [JP] | Japan | 56-97453 |
| Oct. 8, 1981 | [JP] | Japan | 56-159390 |
| Nov. 17, 1981 | [JP] | Japan | 56-184634 |

[51] Int. Cl.$^3$ .............................................. H04N 1/40
[52] U.S. Cl. ...................................... 358/280; 358/80; 358/257; 382/57
[58] Field of Search ................ 358/280, 256, 257, 80; 382/57

[56] References Cited

U.S. PATENT DOCUMENTS

| 3,426,324 | 2/1969 | Manly | 382/57 |
| 3,709,525 | 1/1973 | Frank | 382/57 |
| 3,842,402 | 10/1974 | Ett | 382/57 |
| 4,393,399 | 7/1983 | Gast | 358/80 |

Primary Examiner—Howard W. Britton
Attorney, Agent, or Firm—Fitzpatrick, Cella, Harper & Scinto

[57] ABSTRACT

An image processing apparatus has CCDs for reading image data of an original, an edge detector for detecting edges of an area specified on the original with a loop or marks of a specific color, an area detector for detecting the specified area, memories for storing the image data read by the CCDs, and a data selector and a data switching circuit for selecting the image data read by one of the CCDs which is to be supplied to an inkjet head for recording. For preventing contamination of the original, the loop or marks can be drawn on the original through an original cover including a transparent or semitransparent sheet member facing the image of the original. Images inside and outside the area or areas can be selectively reproduced in various combinations of the normal mode, red output modes involving different types of color conversion, and extinguishing mode. Image data from another source which is stored in another memory can be inserted at a desired part of the reproduced copy.

31 Claims, 40 Drawing Figures

| DOUT | 0 | 1 | 0 | 1 |
|---|---|---|---|---|
| DOUTR | 0 | 0 | 1 | 1 |
| DHB | 1 | 0 | 0 | 0 |
| DHR | 0 | 0 | 1 | 1 |
|  | NORMAL MODE | EXTINGUISHING MODE | RED OUTPUT MODE 1 | RED OUTPUT MODE 2 |

COLOR CONVERSION

IMAGE PROCESSING APPARATUS

BACKGROUND OF THE INVENTION

1. Field of the Invention

The present invention relates to an image processing apparatus such as a copying machine or a facsimile.

2. Description of the Prior Art

Image processing includes trimming wherein images of desired areas of an original alone are extracted for recording, and overlay wherein desired areas of two originals are synthesized and recorded on a single recording paper sheet. In order to perform trimming or overlay, the image on the entire area of the original is supplied to a display device such as a CRT according to a conventional method. Desired areas of the image are then specified on the CRT with a cursor, a light pen or the like. Thereafter, desired image processing is performed in accordance with the specified areas. However, with this method, it is difficult to perform image processing in real time. Furthermore, a CRT of high resolution is required and the overall apparatus becomes costly. Another conventional method is known wherein a flying spot is scanned to draw a loop, and the edge of the area specified by the path of movement of the flying spot is two dimentionally detected. However, it is also difficult to perform image processing in real time with this method. Moreover, a page memory for storing the image of the original is required in some cases, resulting in a complex and costly apparatus.

Another method for specifying an area with a copying machine is known which adopts a coordinate specifying means such as a cursor lever on the original table. However, since the shape of the cursor lever which may be used is limited, the shape of the area specified thereby is also limited. Thus, this cursor lever is poor in operability.

With any of the conventional methods described above, the user must perform mechanical operations for specifying areas, so that the working efficiency is degraded.

SUMMARY OF THE INVENTION

The present invention has been made in consideration with this and has for its object to provide a novel image processing apparatus which is excellent in operability.

It is another object of the present invention to provide an image processing apparatus which allows an easy specifying operation of desired areas of an original or originals.

It is still another object of the present invention to provide an image processing apparatus which is capable of specifying an area or areas without errors.

It is still another object of the present invention to provide an image processing apparatus which is capable of subjecting the image of a specified area of an original to various types of processing.

The above and other objects of the present invention will become apparent from the following description when taken in conjunction with the accompanying drawings.

DETAILED DESCRIPTION OF THE PREFERRED EMBODIMENTS

Figure 1:
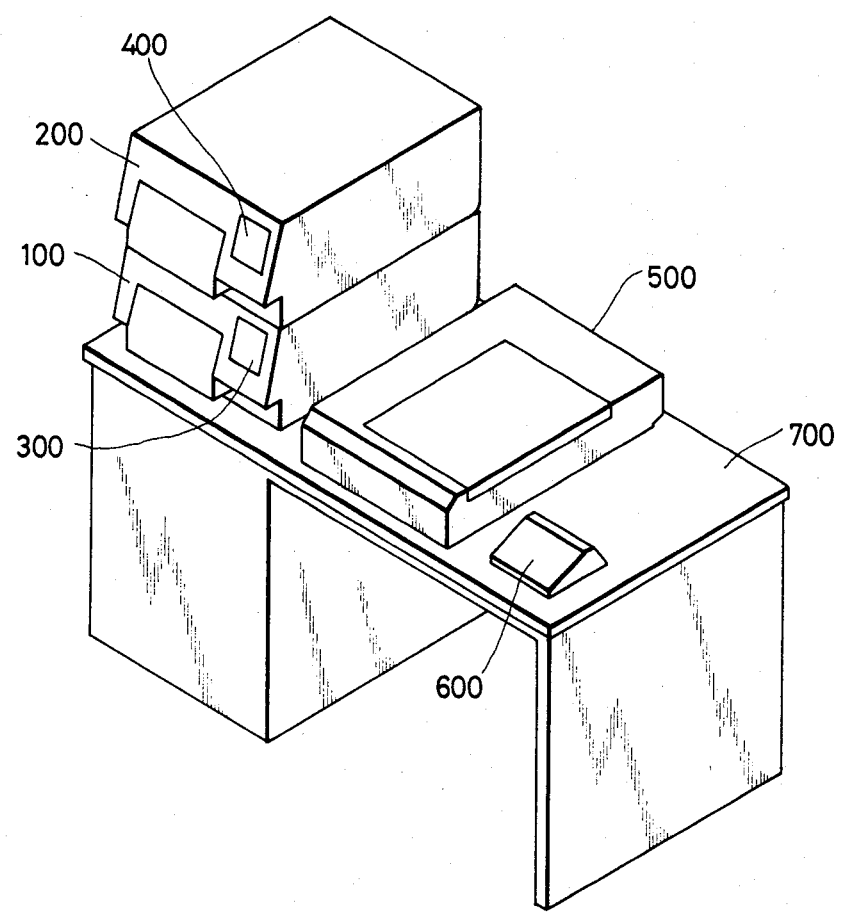
FIG. 1 is a perspective view showing the outer appearance of an image processing apparatus according to the first embodiment of the present invention.

FIG. 1 shows an image processing apparatus according to the first embodiment of the present invention. Recording units 100 and 200 of the same configuration respectively have black and red recording heads such as inkjet heads. These recording units 100 and 200 record image data on a recording medium such as a paper sheet. Console panels 300 and 400 have a switch for selecting the recording unit to be described later, various switches for specifying the recording mode, a display for displaying the recording mode or the like, and so on. A reading unit 500 has an image sensor such as a CCD for photoelectrically reading the image data on an original set at a predetermined position on an original table. Another console panel 600 has ten keys for presetting the number of copies to be produced, a clear key, a set copy number display for displaying the preset number of copies to be produced, a copy start button, a stop key for interrupting the copying operation, and so on. These various pieces of equipment are arranged on a table 700.

In accordance with the input data from the console panels 600, 300 and 400, the image signals output by the reading unit 500 are processed in a predetermined manner and are then supplied to one or both of the recording units 100 and 200. On the basis of the input image signals, the recording units 100 and 200 perform recording on a recording medium or media.

Figure 2:
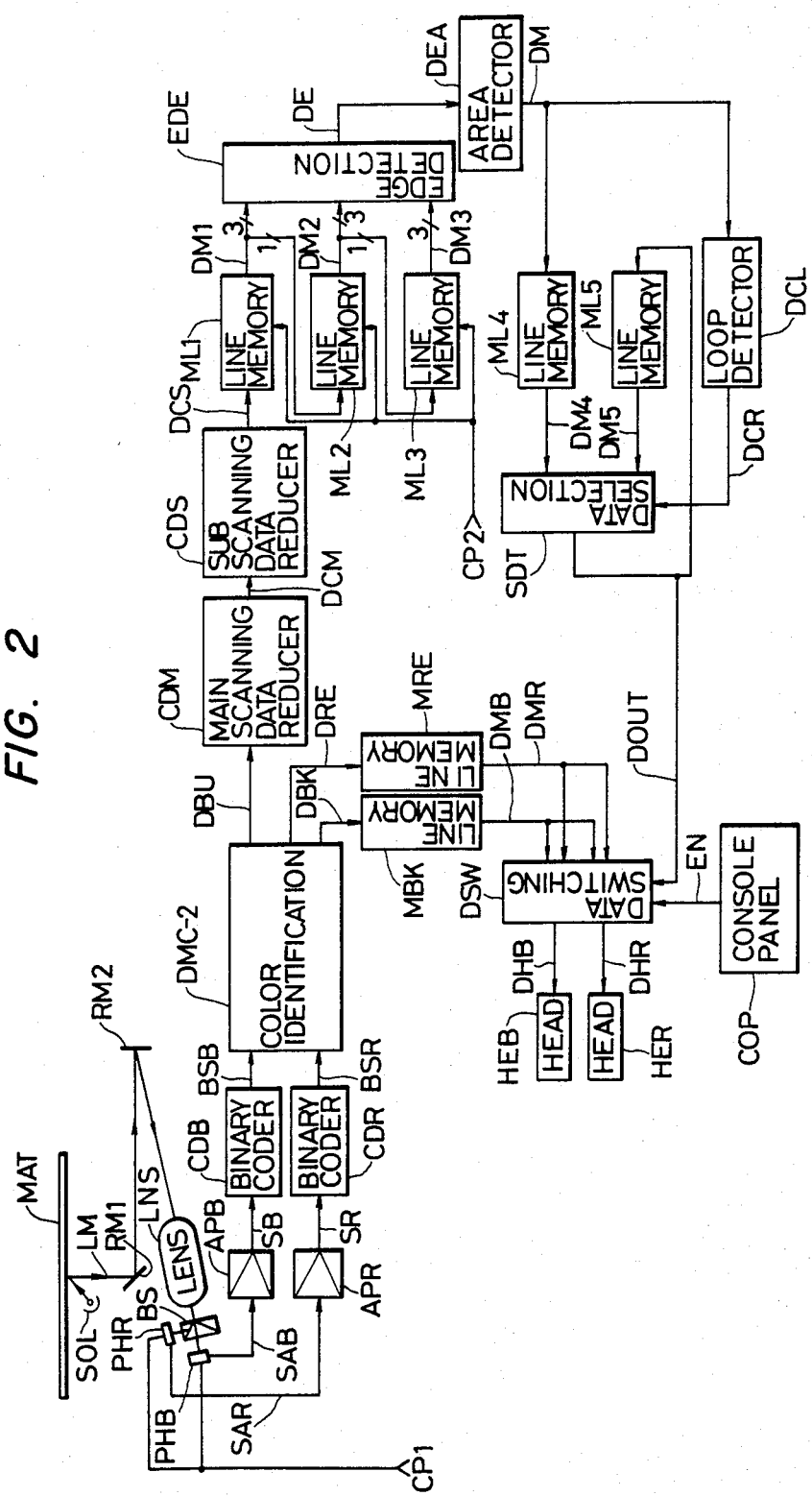
FIG. 2 is a block diagram of an example of the circuit configuration of the device shown in FIG. 2.

FIG. 2 is a block diagram of an example of the configuration of the image processing apparatus shown in FIG. 1. Since the recording units 100 and 200 are of the same configuration, the description will be made regarding recording with only the recording unit 100 for the sake of simplicity.

An original MAT is assumed to be of A4 size and to have a black and red image thereon. An area of the original MAT is specified by drawing a loop of a certain width in a color other than black and red such as blue. The original MAT is illuminated by light emitted from a light source SOL such as a fluorescent lamp or a halogen lamp. Reflected light LM from the original MAT is reflected by a first reflecting mirror RM1 and a second reflecting mirror RM2 and then becomes incident on a beam splitter BS through an imaging lens LNS. The beam splitter BS transmits blue light of short wavelength and reflects red light of long wavelength. Blue light transmitted by the beam splitter BS becomes incident on a photoelectric transducer PHB, and red light reflected by the beam splitter BS becomes incident on a photoelectric transducer PHR. Each of these photoelectric transducers have a plurality of linearly arranged photoelectric conversion elements such as CCDs. Thus, the photoelectric transducer PHB detects the intensity of incident blue light and converts it into electric signals or blue signals SAB. Similarly, the photoelectric transducer PHR detects incident red light and converts it into red signals SAR. In response to clock pulses CP1, the photoelectric transducers PHB and PHR serially output the blue and red signals SAB and SAR to amplifiers APB and APR, respectively. A color separation filter may be used in place of the beam splitter BS.

Amplified blue signals SB from the amplifier APB are supplied to a binary coder CDB to be converted into binary blue signals BSB which are supplied to a color identification circuit DMC. Similarly, amplified red signals SR are supplied to another binary coder CDR to be converted into binary red signals BSR which are also supplied to the color identification circuit DMC. The color identification circuit DMC performs color identification according to the binary blue signals BSB and the binary red signals BSR to generate blue data DBU, red data DRE and black data DBK.

Discrimination of the specified area is performed on the basis of the blue data DBU thus obtained. Noise reduction is performed first to allow area discrimination even if the blue data DBU contains noise. The blue data DBU is first supplied to a main scanning data compressor CDM which produces main scanning compressed data DCM. The main scanning compressed data DCM is supplied to a subscanning data compressor CDS for further data compression which produces subscanning compressed data DCS. The subscanning compressed data DCS is sequentially stored in a first line memory ML1 in response to clock pulses CP2. Readout data DM1 (3-bit data) read out from the first line memory ML1 in response to the same clock pulses CP2 is supplied to an edge detector EDE while at the same time one bit thereof is supplied to a second line memory ML2. The second line memory ML2 also sequentially stores the readout data DM1 (1-bit) in response to the clock pulses CP2. Readout data DM2 (3-bit data) read out from the second line memory ML2 in response to the clock pulses CP2 is also supplied to the edge detector EDE, and one bit thereof is supplied to a third line memory ML3. The readout data DM2 is stored in the third line memory ML3 and readout data DM3 (3-bit data) is read out therefrom in response to the clock pulses CP2. The readout data DM3 is supplied to the edge detector EDE.

In accordance with the three pieces of readout data DM1, DM2 and DM3 which are time-serially input, the edge detector EDE detects the edge of the area specified by the blue loop on the original MAT or the edge data DE. The detected edge data DE is supplied to an area detector DEA which outputs area data DM to a loop detector DCL and to a fourth line memory ML4. The fourth line memory ML4 sequentially stores the area data DM. Readout data DM4 read out from the fourth line memory ML4 is supplied to a data selector SDT. When a data selection control signal DCR from the loop detector DCL is supplied to the data selector SDT, either of the readout data DM4 from the fourth line memory or readout data DM5 from a fifth line memory ML5 is selected as an output signal DOUT. The output signal DOUT or a data switching control signal DOUT from the data selector SDT as data discriminating the specified area is supplied to a data switching circuit DSW. At the same time, the output signal DOUT is supplied to the fifth line memory ML5 to be stored therein for the next one scanning interval.

The black data DBK from the color identification circuit DMC is stored in a line memory MBK and the red data DRE therefrom is stored in another line memory MRE. Two pairs of readout data DMB and DMR from these line memories DMB and DMR are supplied to the data switching circuit DSW. The data switching circuit DSW supplies black data DHB to a black recording head HEB or red data DHR to a red recording head HER in accordance with the output signal or the data switching control signal DOUT from the data selector SDT and an enable signal EN for specifying a desired mode input through a console COP. The black recording head HEB is an inkjet head for recording in black, and the red recording head HER is an inkjet head for recording in red. In accordance with the black data DHB and the red data DHR, these heads HEB and HER jet the ink to form a black and red image on a recording paper sheet (not shown) in correspondence with the image data at the area specified by the blue loop on the original MAT.

The line memories MBK and MRE are incorporated to synchronize the output of the image data of each scanning line with the data processing for obtaining the data switching control signal by data compression and edge detection.

Figure 3:
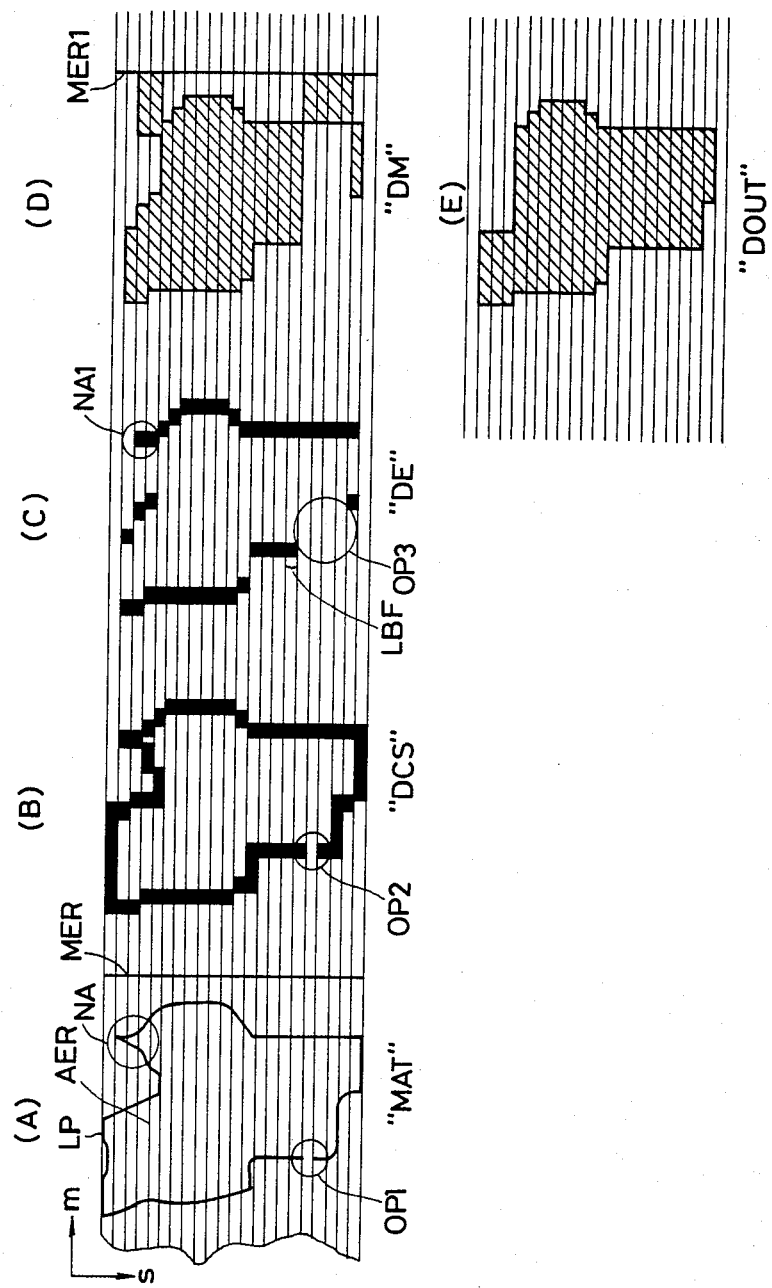
FIG. 3(A-E) is views showing respective steps of image processing of the circuit shown in FIG. 1.

FIGS. 3(A) to 3(E) show data in each step of data processing by the apparatus as shown in FIG. 1. As shown in FIG. 3(A), an area AER to be read is specified by drawing a loop LP in blue on the original MAT (A4 size) MER corresponds to the right edge of the original MAT, and OP1 is a missing part of the loop LP. The specified area of the original MAT is then subjected to main scanning in the direction indicated by arrow m by the photoelectric transducers, and is also subjected to subscanning in the direction indicated by arrow s after each main scanning line. The image of the original including the loop LP is thus optically read. FIG. 3(B) shows the subscanning compressed data DCS which is obtained by main scanning compression and subscanning compression of the blue data DBU which is, in turn, obtained by the scanning operation as described above. The subscanning compressed data DCS has a missing part OP2 of one main scanning line corresponding to the missing part OP1 of the loop LP. FIG. 3(C) shows the edge data DE obtained from the edge detector EDE in accordance with the compressed data DCS. The edge data DE also has a missing part OP3 corresponding to the missing part OP2.

The area detector DEA comprises one D flip-flop (to be referred to as an FF hereinafter). The FF is set by the leading edge (left edge of the loop LP) of the edge data DE within one scanning line and is reset by the trailing edge (right end of the loop LP) of the edge data DE. The FF is set and reset by a pair of edge data DE in this manner. An interval TZK in which the FF is set corresponds to the area AER within one scanning line. There are cases wherein a plurality of pairs of edge data is obtained within one scanning line. FIG. 3(D) shows the area data DM from the area detector DEA in such a case. The hatched area corresponds to the interval TZK in which the FF of the area detector DEA is in the set state. Referring to FIG. 3(D), the FF of the area detector DEA is not set at the missing part OP3 which does not have the leading edge of the edge data DE and which corresponds to the left edge of the loop. Instead, the FF is set by the trailing edge of the edge data DE at the right edge of the loop. This erroneous setting of the FF continues up to an original read terminal end MER corresponding to the right end MER of the original MAT is red. FIG. 3(A) shows a narrow part NA of the area AER specified by the loop LP. The edge data DE corresponding to this part NA is leading edge data NA1 alone and does not contain terminal edge data. Thus, the FF of the area detector DEA is set by the leading edge data NA1 up to the original read terminal end MER1. In this manner, according to the shape of the loop LP, erroneous area data DM is output by the area detector DEA indicating that part outside the area AER is within the area.

In order to prevent this, the present invention has a special feature. According to this feature, if the original read terminal end MER1 is detected when an output signal indicating "within the specified area" is output from the area detector or when the FF is in the set status, the edge data DE obtained from the immediately preceding main scanning line is utilized. More specifically, as for four lines corresponding to the missing part OP3 in FIG. 3(C), leading edge data LBF from the immediately preceding line is used as the initial edge data. For this purpose, the edge data DE of the current scanning line is stored in the fourth line memory while the edge data DE of the immediately preceding line is stored in the fifth line memory ML5. When the original read terminal end MER1 is detected within the specified area, the edge data DE of the immediately preceding line stored in the fifth line memory ML5 is selected by the data selector SDT for output. FIG. 3(E) shows the output signal DOUT obtained in this manner and the area specified by this signal. As may be seen from this, area specifying data is then obtained for an area which resembles the area AER surrounded by the loop LP shown in FIG. 3(A).

Although the loop LP may be directly drawn on the original MAT to specify the area AER, this is inconvenient if the original must not be contaminated.

Furthermore, if the original is an important document, the loop must not be directly drawn on the original. Then, a copy of the original must be produced for drawing a loop thereon. If the original is printed with water-soluble ink, the loop must be drawn with oil-soluble ink so as to prevent blurring. In this case, a transparent film may be placed on the original MAT and a loop LP may then be drawn thereon with a marker using a dry ink. Then, the original MAT may not be contaminated. When recording is completed, the loop LP may be easily erased.

Figure 4:
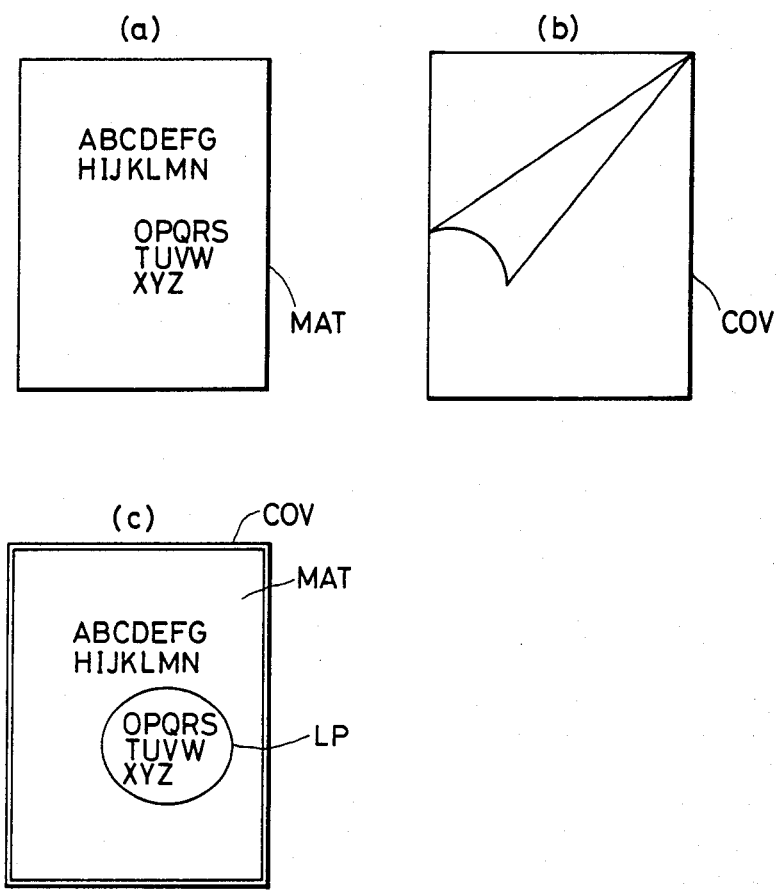
FIG. 4(a)-(c) is views showing other methods for specifying areas.

FIG. 4 shows an example of such a method.

FIG. 4(a) shows an original MAT and FIG. 4(b) shows an original cover COV. The original cover COV consists of two rectangular sheet members. At least one side each of the rectangular sheet members is open. The original MAT is inserted and securely held between the sheet members through the opening sides. Two sides each of the sheet members are open in the example shown in FIG. 4(b). At least one of the two rectangular sheet members is transparent or semitransparent and is a polymer film or sheet of polyolefin, polyester, or cellulose.

The original MAT is inserted in the original cover COV so that the image on the original MAT may face the transparent or semitransparent sheet member. FIG. 4(c) shows the state in which the original MAT is inserted in the original cover COV in this manner.

After the original MAT is inserted in the original cover COV, a loop LP is drawn in blue on the transparent or semitransparent sheet member to specify an area including the image.

The original MAT inserted in the original cover COV is placed at a predetermined position of the reading unit 500 shown in FIG. 1.

Thus, the original MAT and the transparent or semitransparent sheet member containing the area specifying data are superposed on the reading unit 500. The image on the original is read through the sheet member having the area specifying data. Then, the image of the original and the area specifying data may be simultaneously read.

If the transparent or semitransparent sheet member is hydrophilic, a hydrophilic ink is conveniently used for drawing a loop LP. On the other hand, if the transparent or semitransparent sheet member is hydrophobic, a hydrophobic ink is conveniently used. Then, the loop LP may not be repellent to the ink.

If an ink which allows easy erasure after drying is used, the original cover COV may be repeatedly used.

The original cover COV need not always comprise two rectangular sheets and need only include a transparent or semitransparent sheet member for covering the image of the original.

The sheet member may also comprise a transparent or semitransparent film of polyamide-type, acrylic-type or PVA-type.

The original cover COV may be arranged at the reading unit 500 in advance.

Figure 5:
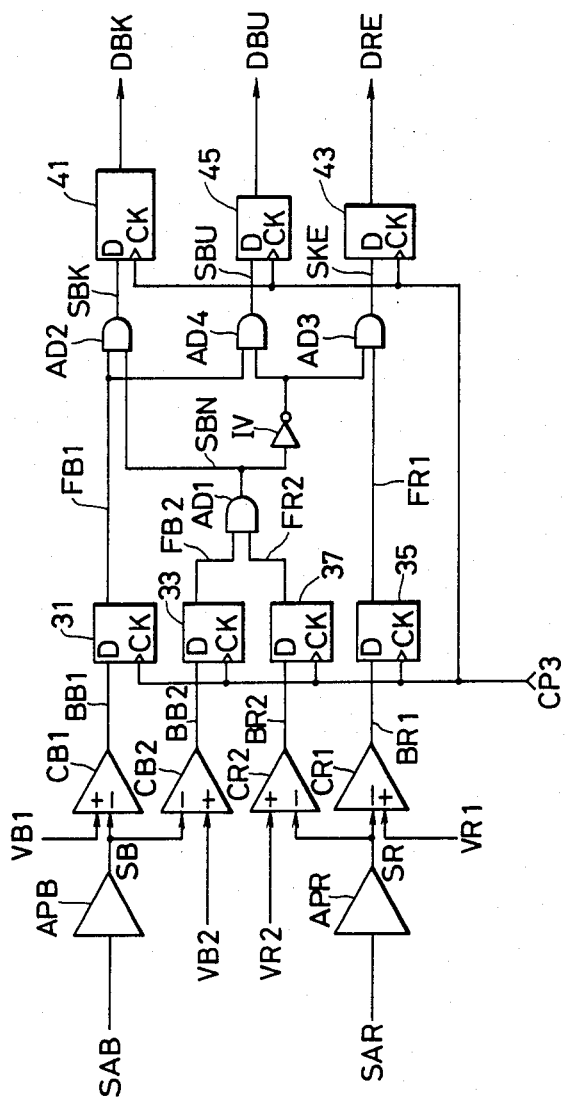
FIG. 5 is a block diagram of the first example of a color identification circuit.
Figure 6:
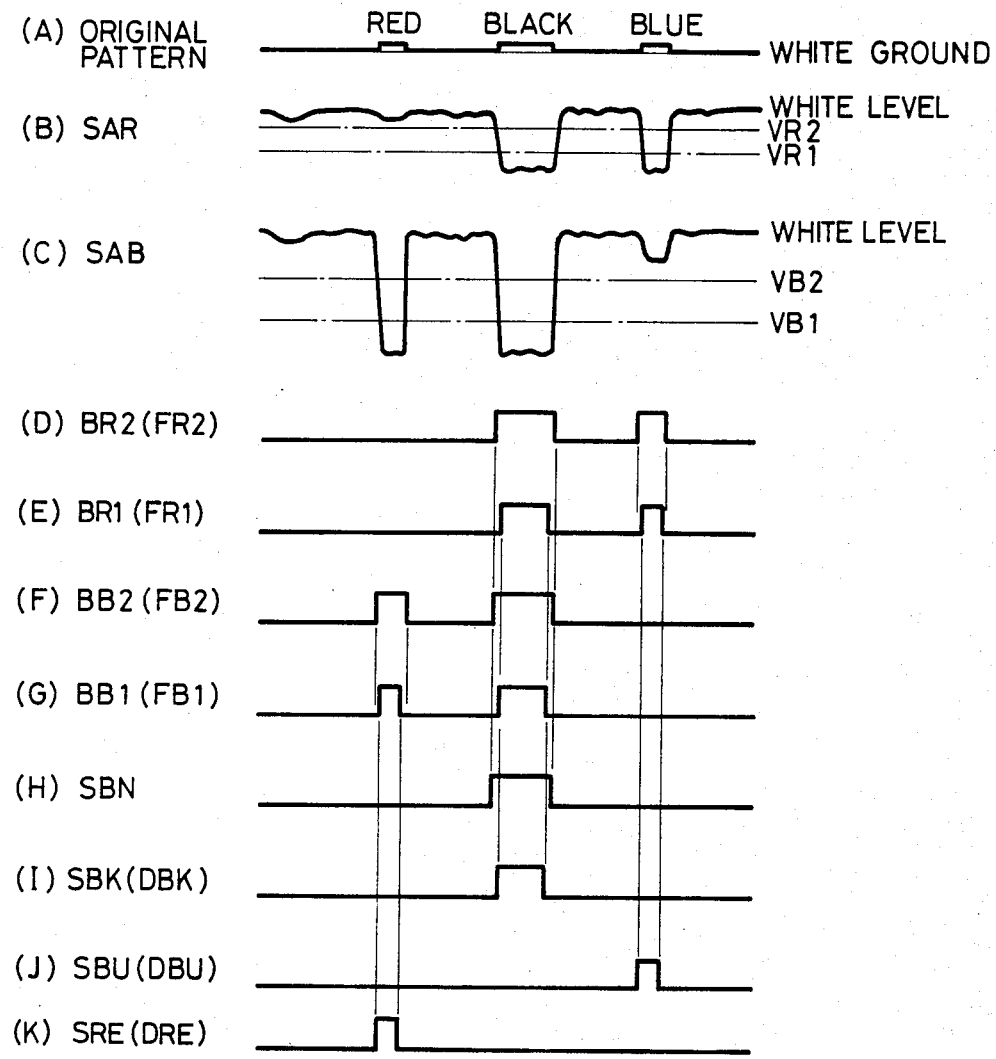
FIG. 6 shows signal waveforms for explaining the mode of operation of the circuit shown in FIG. 5.

FIG. 5 shows a circuitry including the amplifiers APB and APR and the color identification circuit DMC. FIGS. 6(A) to 6(K) show waveforms at respective parts of the circuitry. Referring to these figures, the amplified blue signal SB is supplied to the inverting input terminals of comparatives CB1 and CB2, while the amplified red signal SR is supplied to the inverting input terminals of comparators CR1 and CR2. A threshold voltage VB1 of the first slicing level close to the dark level of the blue signal level is supplied to the non-inverting input terminal of the comparator DB1, while a threshold voltage VB2 of the second slicing level close to the bright level is supplied to the non-inverting input terminal of the comparator CB2. Similarly, a threshold voltage VR1 of the first slicing level close to the dark level of the red signal level is supplied to the non-inverting input terminal of the comparator CR1, while a threshold voltage VR2 of the second slicing level close to the bright level is supplied to the non-inverting input terminal of the comparator CR2. When the signals SB and SR become lower in level than the threshold voltages, the outputs from the associated comparators go to high level. When the signals SB and SR become lower in level than the threshold voltages, the outputs from the associated comparators go to low level. Thus, the signals SB and SR are binary-coded.

Assume that the original MAT has an image of red, black and blue on a white background and has a pattern as shown in FIG. 4(a). Since the slicing level differs from one color to another, the pulse width corresponding to the image of the original which is sliced at the first slicing level is narrower than that obtained by slicing at the second slicing level. Thus, an output signal BB1 from the comparator CB1 corresponding to a color is narrower in pulse width than an output signal BB2 from the comparator CB2 corresponding to the same color. Similarly, an output signal BR1 from the comparator CR1 is narrower in pulse width than an output signal BR2 from the comparator CR2.

The digitized output signals BB1, BB2, BR1 and BR2 are supplied to D input terminals of FFs 31, 33, 35 and 37, respectively. Clock pulses CP3 are commonly supplied to clock input terminals CK of these FFs 31, 33, 35 and 37. In response to the clock pulses CP3, the signals BB1, BB2, BR1 and BR2 are latched in the associated FFs 31, 33, 35 and 37. Signals FB1, FB2, FR1, and FR2 are output from Q output terminals of the FFs 31, 33, 35 and 37. The signals FB2 and FR2 are supplied to an AND gate AD1 which produces a black signal SBN. This black signal SBN goes to high level only in correspondence with the black portion of the image. The black signal SBN is supplied to one input terminal of an AND gate AD2. After the black signal SBN is inverted by an inverter IV, it is supplied to one input terminal each of AND gates AD3 and AD4. The signal FB1 from the FF 31 is supplied to the other input terminal each of the AND gates AD2 and AD4, and the signal FR1 from the FF 35 is supplied to the other input terminal of the AND gate AD3. The AND gate AD3 outputs a signal SBK which goes to high level only in correspondence with a black portion of the image. The AND gate AD3 outputs a signal SRE which goes to high level only in correspondence with a red portion of the image. The AND gate AD4 outputs a signal SBU which goes to high level only in correspondence with a blue portion of the image. These signals SBK, SRE and SBU are supplied to D input terminals of FFs 41, 43 and 45, respectively. The clock pulses CP3 are also supplied to the clock input terminals CK of these FFs 41, 43 and 45. In response to these clock pulses CP3, these signals SBK, SRE and SBU are latched in the associated FFs 41, 43 and 45 which respectively output the black data DBK, the red data DRE and the blue data DBU.

Figure 7:
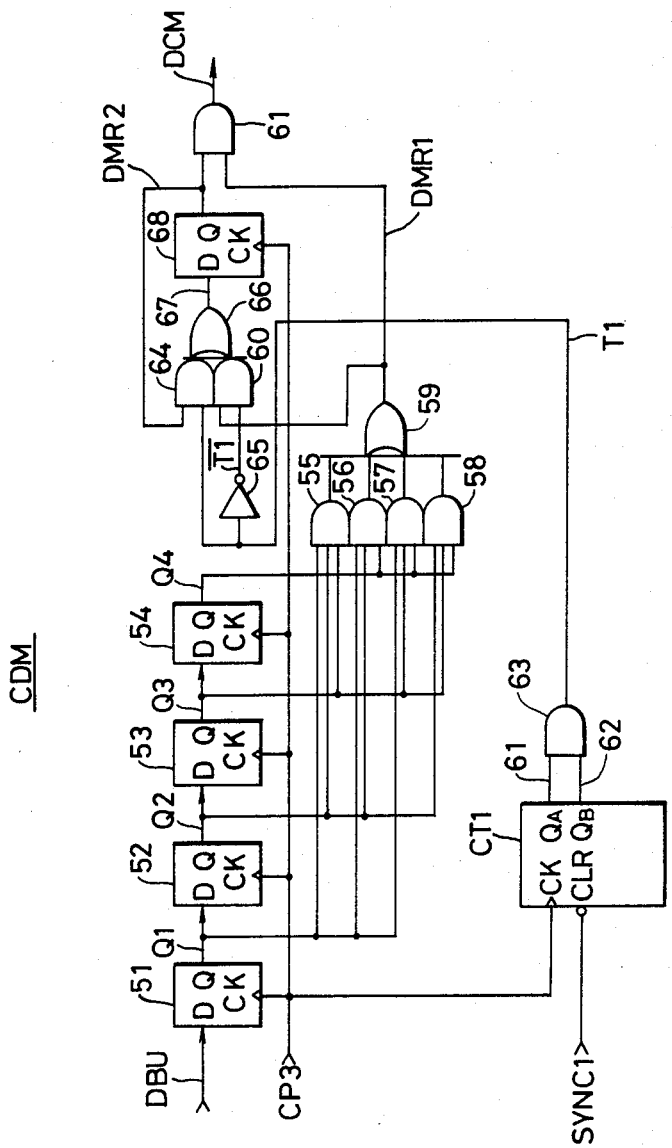
FIG. 7 is a block diagram of an example of a main scanning data compressor.

FIG. 7 shows an example of the main scanning data compressor CDM shown in FIG. 2. Four FFs 51 to 54 are series-connected. The Q output signals Q1, Q2 and Q3 from the FFs 51, 52 and 53 are supplied to an AND gate 55. The Q output signals Q1, Q2 and Q4 from the FFs 51, 53 and 54 are supplied to an AND gate 56. The Q output signals Q1, Q3 and Q4 from the FFs 51, 53 and 54 are supplied to an AND gate 57. The Q output signals Q2, Q3 and Q4 from the FFs 52, 53 and 54 are supplied to an AND gate 58. The output signals from these AND gates 55, 57 and 58 are supplied to an OR gate 59 which produces a logic signal DMR1. This logic signal DMR1 is supplied to one input terminal each of AND gates 60 and 61.

When a synchronizing signal SYNC1 is supplied to a clear terminal CLR of a hexadecimal counter CT1, the count data of this counter CT1 is cleared and starts counting the clock pulses CP3 supplied to the clock terminal CK thereof. A ½ frequency-divided signal 61 from an output terminal QA of the hexadecimal counter CT1 and a ¼ frequency-divided signal 62 from an output terminal QB are supplied to an AND gate 63. An output signal T1 from the AND gate 63 is supplied to one input terminal of an AND gate 64. The output signal T1 from the AND gate 63 is supplied to an inverter 65. The inverter 65 outputs an inverted signal $\overline{T1}$ to the other input terminal of the AND gate 60. The output signals from the AND gates 60 and 64 are supplied to an OR gate 66. The OR gate outputs a logic sum signal 67 to a D input terminal of an FF 68. A logic signal DMR2 from the Q output terminal of the FF 68 is supplied to the other input terminal each of the AND gates 61 and 64. The main scanning compressed data DCM is obtained from the blue data DBU by the main scanning data compressor CDM by commonly supplying the clock pulses CP3 to the FFs 51 to 54 and 58 and the hexadecimal counter CT1.

Figure 8:
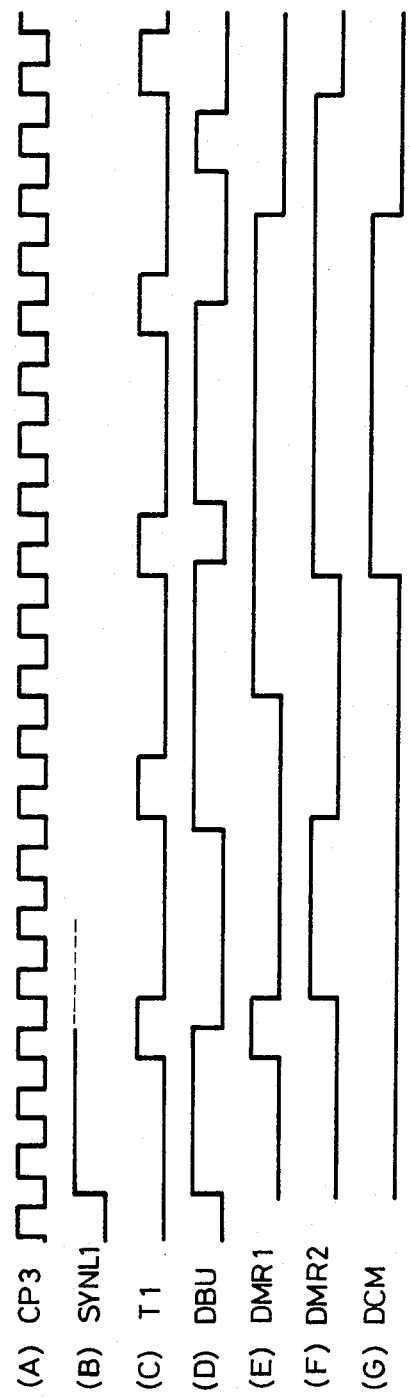
FIG. 8 shows signal waveforms at respective parts of the circuit shown in FIG. 7.

FIGS. 8(A) to 8(G) show signal waveforms at respective parts of the circuitry shown in FIG. 7. Assume that the blue data DBU of the original MAT is a signal as shown in FIG. 8(D). In response to the clock pulse CP3 as shown in FIG. 8(A), the signals T1, DMR1, DMR2 and DCM respectively become as shown in FIGS. 8(C) to 8(G). These four AND gates 55 to 58 and the OR gate 69 constitute a ¾ majority logic circuit. When the majority of input data (3 or more among 4) are at high level, the input data as a whole is regarded to be at high level. The input data of 1,728 bits of one scanning line is compressed to ⅛ or 216 bits by the main scanning data compressor CDM and the compressed data DCM is obtained by the 6/8 majority logic operation.

Figure 9:
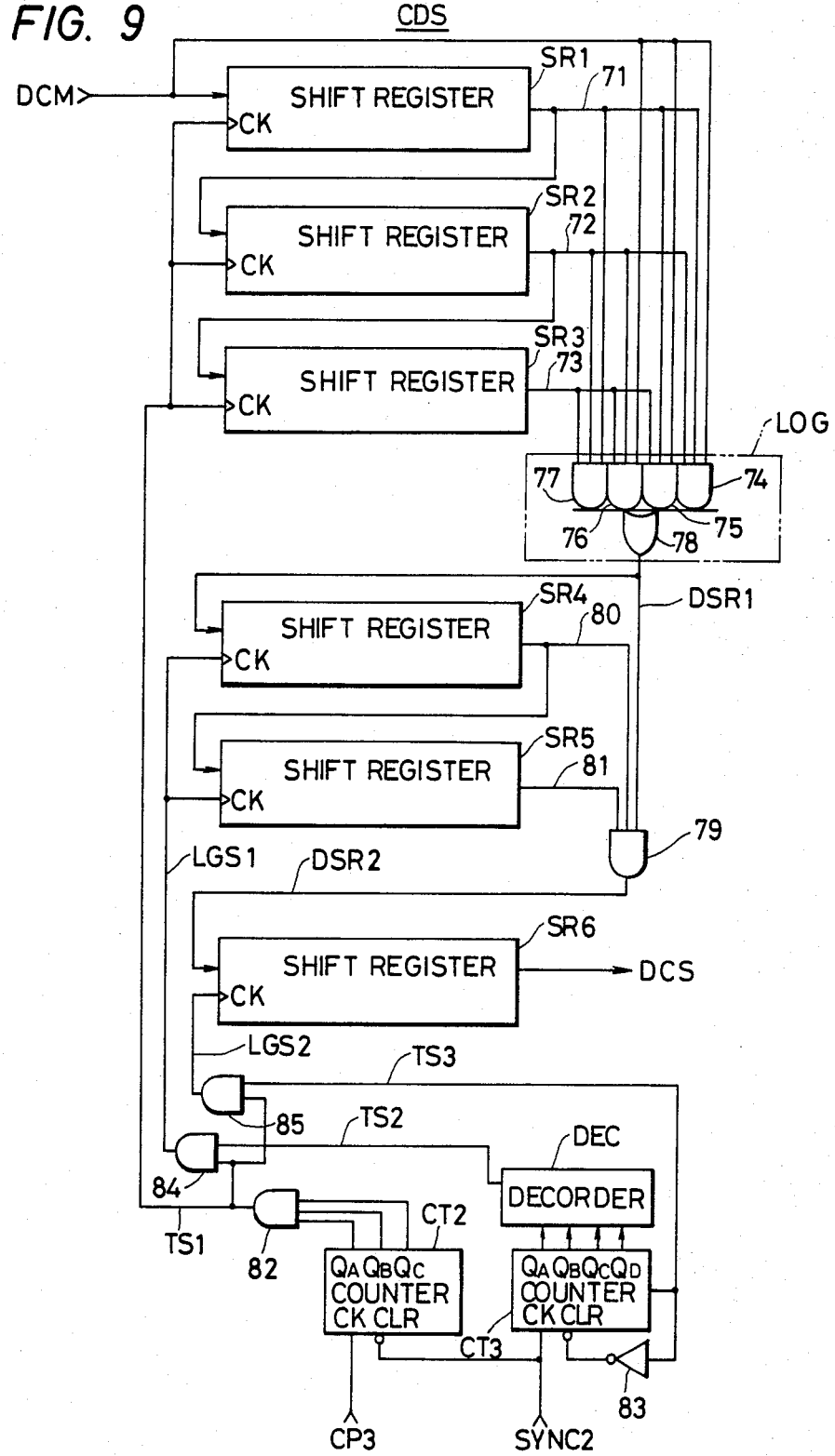
FIG. 9 is a block diagram of an example of a subscanning data compressor.

FIG. 9 shows an example of the subscanning data compressor CDS shown in FIG. 2. The compressed data DCM is supplied to a 215-bit shift register SR1. An output signal 71 from the 215-bit shift register 71 is supplied to a 216-bit shift register SR2. An output signal 72 therefrom is supplied to a 216-bit shift register SR3. A sequence output signal 73 is thus obtained through these three series-connected shift registers SR1, SR2 and SR3. The compressed data DCM is supplied to AND gates 74, 75 and 76. The output signal 71 from the 215-bit shift register SR1 is supplied to AND gates 74, 75 and 77. The output signal 72 from the 216-bit shift register SR2 is supplied to the AND gates 74, 76 and 77. The output signal 73 from the 216-bit shift register SR3 is supplied to the AND gates 75, 76 and 77. The output signals from the AND gates 74 to 77 are supplied to an OR gate 78. An output logic signal DSR1 is supplied to an AND gate 79 as well as to a 216-bit shift register SR4. An output signal 80 from the shift register SR4 is supplied to an AND gate 79 as well as to a 216-bit shift register SR5. An output signal 81 from the shift register SR5 is supplied to the AND gate 79. An output logic signal DSR2 (compressed data DCS in FIG. 2) from the AND gate 79 is supplied to a 216-bit shift register SR6 (part of the first line memory ML1). The shift register SR6 produces subscanning compressed data DCS.

The clock pulses CP3 for controlling the operation of the subscanning data compressor CDS are supplied to the clock terminal CK of a hexadecimal counter CT2. The hexadecimal counter CT2 counts the clock pulses CP3 and outputs a ½ frequency-divided signal QA, a ¼ frequency-divided signal QB and a ⅛ frequency-divided signal QC to an AND gate 82. A first time signal TS1 is obtained from the AND gate 82. A synchronizing signal SYNC2 is supplied to the clear terminal CLR of the hexadecimal counter CT2 as well as to a clock terminal CK of another hexadecimal counter CT3. The hexadecimal counter CT3 counts the received synchronizing signals SYNC2. The counter CT3 outputs a ½ frequency-divided signal QA, a ¼ frequency-divided signal QB, a ⅛ frequency-divided signal QC and a 1/16 frequency-divided signal QD to a decoder DEC. The decoder produces a second time signal TS2. A carry signal is supplied to the clear terminal CLR of the hexadecimal signal CT3 through an inverter 83. This carry signal is used as a third time signal TS3.

The first time signal TS1 is supplied to the clock terminal CK each of the shift registers SR1, SR2 and SR3. The first and second time signals TS1 and TS2 are supplied to an AND gate 84. An output signal LGS1 from the AND gate 84 is supplied to clock terminals of the shift registers SR4 and SR5. The first and third time signals TS1 and TS3 are supplied to an AND gate 85. An output signal LGS2 from the AND gate 85 is supplied to the clock terminal CK of the shift register SR6.

The clock pulses CP3 are signals for main scanning m and are pulse signals generated at each bit. The synchronizing signal SYNC2 is a signal for subscanning s and for counting up the counter CT3 at each line. In response to these clock pulses CP3 and the synchronizing signal SYNC2 for controlling main scanning and subscanning operations, the subscanning data compressor CDS compresses the main scanning compressed data DCM to the data CDCS of the bit number 1/12 that of the data DCM. A logic circuit LOG consisting of four AND gates 74 to 77 and the OR gate 78 compresses the input data into the output data which is ¼ the input data and is a ¾ majority logic circuit. Thus, if three input data among the main scanning compressed data DCM and the output signals 71, 72 and 73 from the shift registers SR1, SR2 and SR3 are of high level, the output logic signal DSR1 from the logic circuit LOG goes to high level. The AND gate 79 is a logic circuit for performing ¼ data compression. Therefore, the logic circuit LOG and the AND gate 79 together perform a 9/12 majority logic operation.

In this manner, the subscanning data compressor CDS outputs the subscanning compressed data DCS which is obtained by bulk processing in units of 12 lines.

Figure 10:
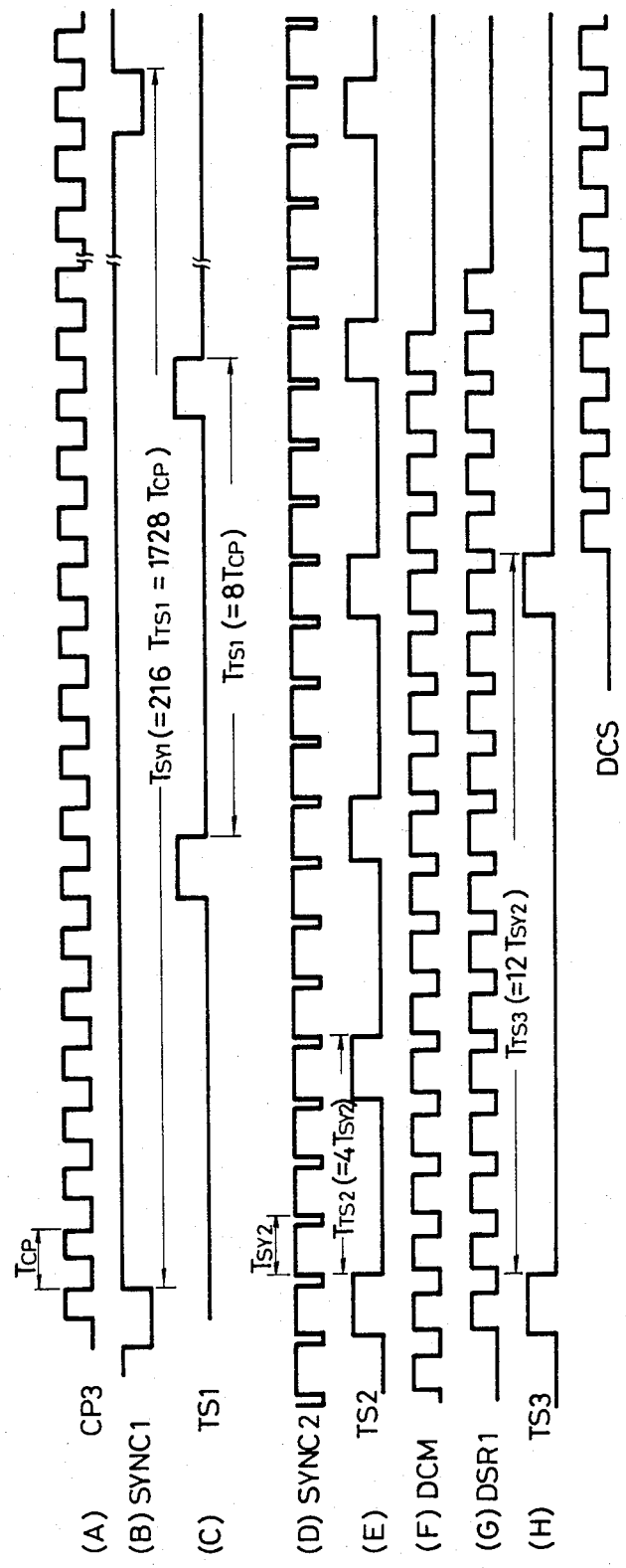
FIG. 10 shows signal waveforms at respective parts of the circuit shown in FIG. 9.

FIG. 10 shows signal waveforms at respective parts of the circuitry shown in FIG. 9. If the clock pulse CP has a period TCP, the syncronizing signal SYNC1 has a period TSY1 which is 1728·TCP. If the synchronizing signal SYNC2 has a period TSY2, the first time signal TS1 has a period TTS1 of 8·TCP, the second time signal TS2 has a period TTS2 of 4·TSY2, and the third time signal TS3 has a period TTS3 of 12·TSY2.

Figure 11:
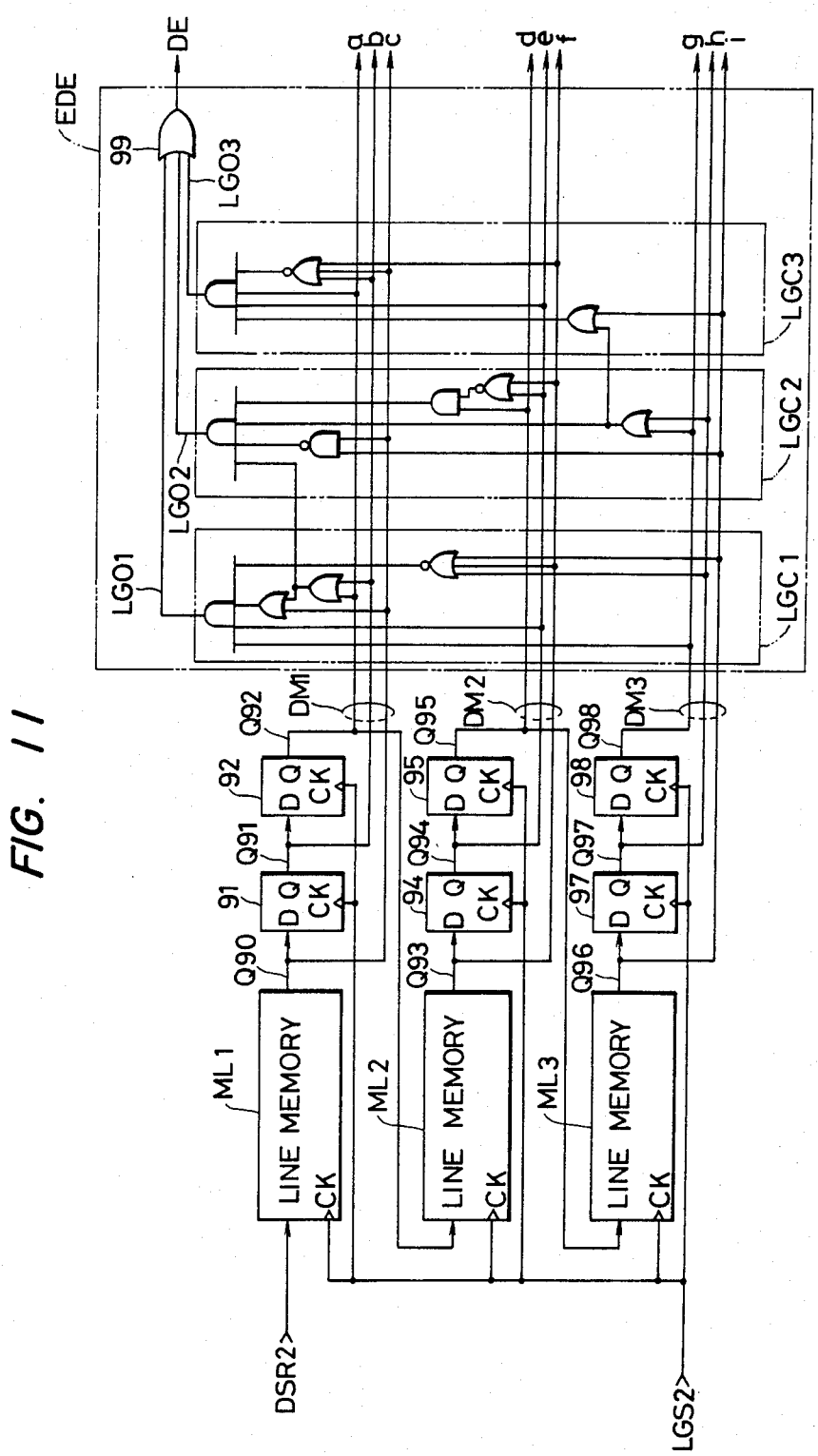
FIG. 11 is a block diagram of an example of an edge detector.

FIG. 11 shows details of the edge detector of the circuit shown in FIG. 2. A logic signal DSR2 is supplied to the first line memory ML1. An output signal Q90 from the first line memory ML1 is supplied to a D input terminal of an FF 91. A Q output signal Q91 from the FF91 is supplied to a D input terminal of an FF92. A Q output signal Q92 from the FF 92 is supplied to the second line memory ML2. An output signal Q93 from the second line memory ML2 is supplied to a D input terminal of an FF 94. A Q output signal Q94 from the FF 94 is supplied to a D input terminal of an FF 95. A Q output signal Q95 from the FF 95 is supplied to the third line memory ML3. An output signal Q96 from the third line memory ML3 is supplied to a D input terminal of an FF 97. A Q output signal Q97 from the FF 97 is supplied to a D input terminal of an FF 98, which produces a Q output signal Q98. With this arrangement, control of the data readout and latch operations is performed by commonly supplying the output signal LGS2 from the AND gate 85 of the subscanning data compressor CDS (FIG. 9) to the clock terminals CK of the line memories ML1, ML2 and ML3 and the FFs 91, 92, 94, 95, 97 and 98.

To the edge detector EDE are supplied the readout data DM1 consisting of signals Q90, Q91 and Q92; the readout data DM2 consisting of the signals Q93, Q94 and Q95; and the readout data DM3 consisting of the signals Q96, Q97 and Q98. The logic circuit constituting the edge detector EDE will be expressed by a logic relation using parameters a, b and c for the readout data DM1; parameters d, e and f for the readout data DM2; and parameters g, h and i for the readout data DM3.

A logic output signal LGO1 from a logic circuit LGC1 is given by:

$$LGO1 = e \cdot g \cdot \bar{f} \cdot \bar{h} \cdot \bar{i} \cdot (a+b+c) \ldots \quad (1)$$

A logic output signal LGO2 from a logic circuit LGC2 is given by:

$$LGO2 = (d \cdot \bar{e} \cdot \bar{f}) \cdot (a+b) \cdot (g+h) \cdot (\overline{c \cdot i}) \ldots \quad (2)$$

A logic output signal LGO3 from a logic circuit LGC3 is given by:

$$LGO3 = a \cdot e \cdot \bar{b} \cdot \bar{c} \cdot \bar{f} \cdot (g+h+i) \ldots \quad (3)$$

On the basis of the logic output signals LGO1, LGO2 and LGO3, an OR gate 99 operates to output the edge data DE.

Figure 12:
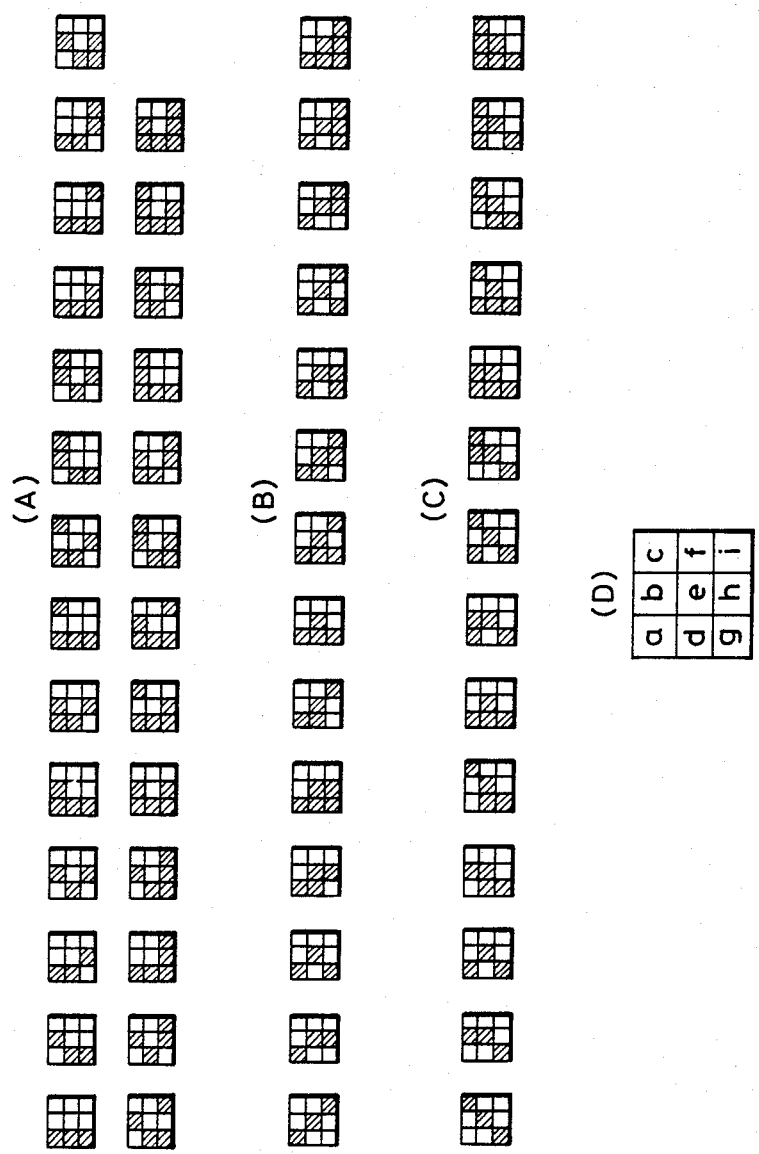
FIG. 12 shows detection patterns of the edge detector shown in FIG. 11.

FIG. 12(A) shows the pattern detected by the logic circuit LGC2, FIG. 12(B) shows the pattern detected by the logic circuit LGC3, and FIG. 12(C) shows the pattern detected by the logic circuit LGC1.

FIG. 12(D) shows the correspondence between the parameters a to i of the readout data DM1, DM2 and DM3 and the respective elements of the 3×3 matrix. The edge data DE is obtained by logic operation according to this matrix form.

Figure 13:
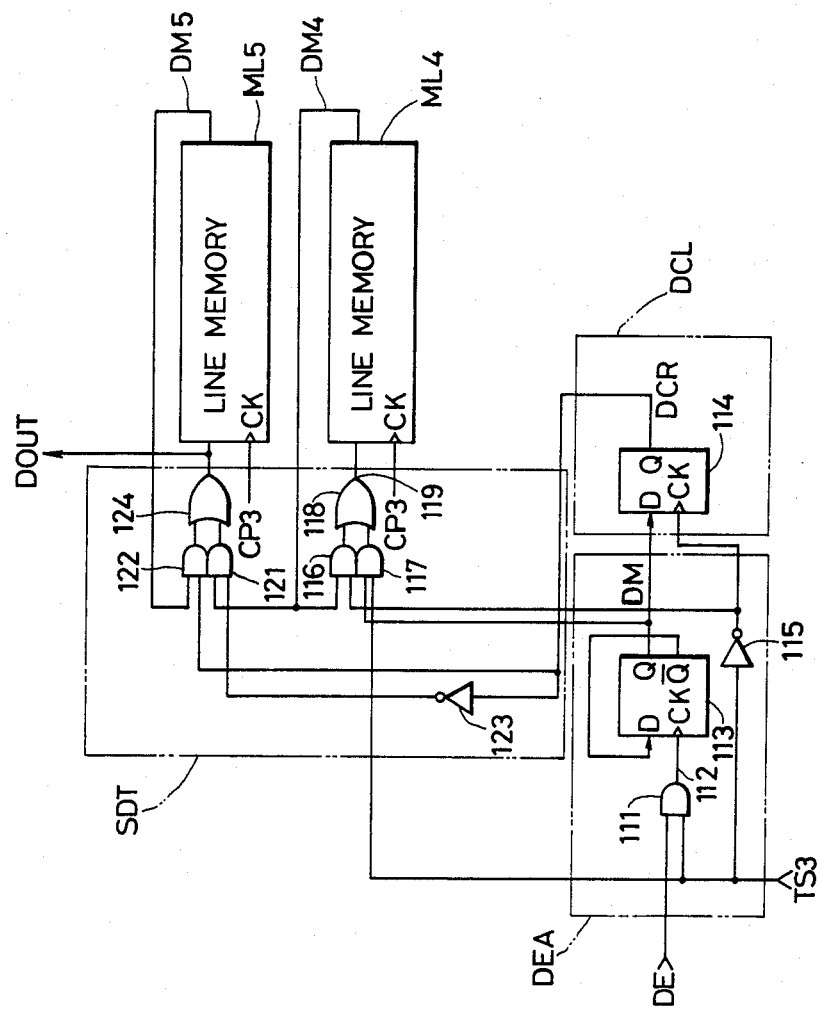
FIG. 13 is a block diagram of an example of a circuit for processing an edge detection signal.
Figure 14:
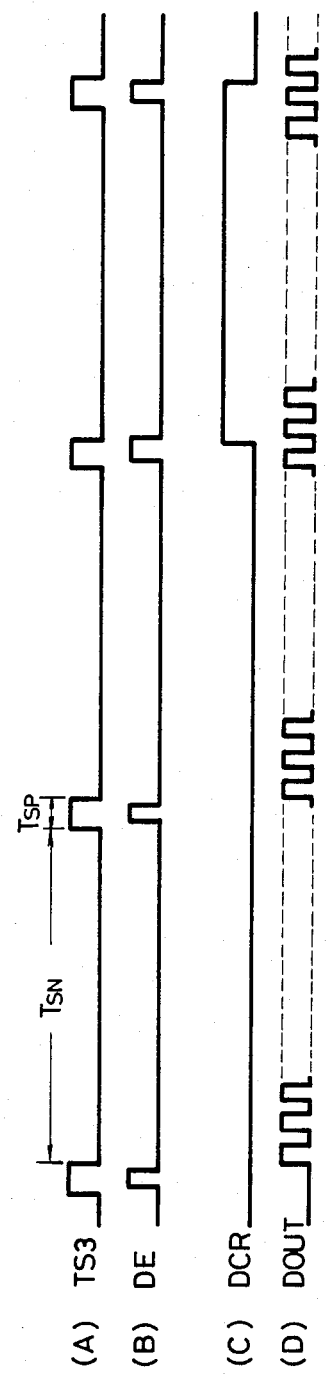
FIG. 14 shows signal waveforms at respective parts of the circuit shown in FIG. 13.

FIG. 13 shows an example of a circuit for obtaining the output signal OUT from the edge data DE. FIGS. 14(A) to 14(D) show signal waveforms at the respective parts of the circuit shown in FIG. 13. Referring to FIG. 13, the edge data DE from the edge detector EDE and the third time signal TS3 from the subscanning data compressor (FIG. 9) are supplied to an AND gate 111 of the area detector DEA. An output signal 112 from the AND gate 111 is supplied to the clock terminal CK of an FF 113. The $\bar{Q}$ output signal from the FF 113 is supplied to its D input terminal, and its Q output signal or the area data DM is supplied to the D input terminal of an FF 114 constituting a loop detector DCL. After inverting the third time signal by an inverter 115, it is supplied to the clock terminal CK of the FF 114 as well as to an AND gate 116 of the data selector SDT. The third time signal TS3 and the area data DM are supplied to an AND gate 117. On the basis of the output signals from the AND gates 116 and 117, an OR gate produces an output signal 119 to the fourth line memory ML4. In response to the clock pulse CP3 supplied to its clock terminal CK, the fourth line memory ML4 allows reading out of readout data DM4 stored therein. The readout data DM4 from the fourth line memory ML4 is supplied to AND gates 116 and 121. The Q output signal or the data selection control signal DCR from the FF 114 in the loop detector DCL is supplied to another AND gate 122. The Q output signal from the loop detector DCL is also supplied to the AND gate 121 through an inverter 123. The output signals from the AND gates 121 and 122 are supplied to an OR gate 124. The output signal DOUT from the OR gate 124 is supplied to the fifth line memory ML5. Readout of data stored in the fifth line memory ML5 is performed in response to the clock pulse CP3 supplied to its clock terminal CK. The readout data DM5 read out from the fifth line memory ML5 in response to the clock pulses CP3 is supplied to the AND gate 122.

During an interval TSN of the third time signal TS3, data of 11 scanning lines is processed. In an interval TSP of the third time signal TS3, data of one scanning line is processed. Thus, data of 12 scanning lines is processed during one period of the third time signal.

Figure 15:
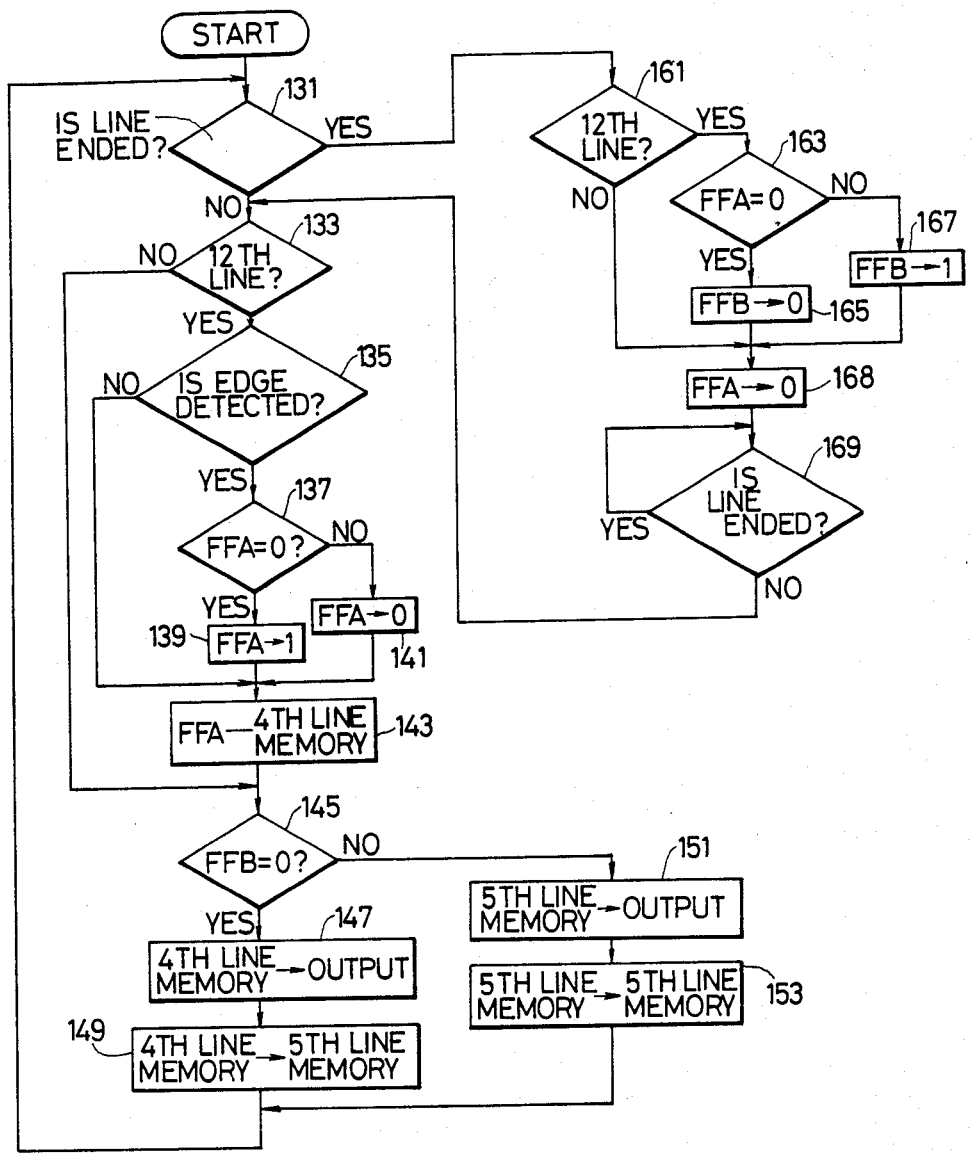
FIG. 15 is a flowchart showing the mode of operation of the circuit shown in FIG. 13.

FIG. 15 shows a flowchart for explaining the mode of operation of the circuit shown in FIG. 13. A description will now be made with reference to FIGS. 13, 14 and 15.

In step 131, it is discriminated if the current line has been scanned or if an original read terminal end MER1 has been detected. If NO in step 131, it is discriminated in step 133 if the current line is the 12th line. If YES in step 133, it is discriminated in step 135 if edge detection has been made. If YES in step 135, it is discriminated in step 137 if FFA (representing the logic status of the Q output signal from the FF 113 included in the area detector DEA shown in FIG. 13) is at level "0". If YES in step 137 or FFA=0, the FF 113 is set in step 139. If NO or FFA=1 in step 137, the FF 113 is reset in step 141. As in the case that NO is obtained in step 135, the flow advances to step 143. In step 143, FFA is stored in the fourth line memory ML4. As in the case that NO is obtained in step 133, it is discriminated in step 145 if FFB (representing the logic status of the Q output signal from the FF 114 of the loop detector) is at level "0". If YES in step 145, the readout data DM4 from the fourth line memory ML4 is selected as the output signal DOUT by the data selector SDT in step 147. In step 149, the readout data DM4 is stored in the fifth line memory ML5. If NO in step 145, the readout data DM5 is selected as the output signal DOUT by the data selector SDT in step 151. In step 153, the readout data DM5 is stored in the fifth line memory ML5. After this data selection, the flow returns to step 131.

If YES in step 131, it means that the original read terminal end MER1 of the current line has been detected. Then, the flow advances to step 161 wherein it is discriminated if the current line is the 12th line. If YES, in step 161, it is discriminated in step 163 if FFA is at level "0". If YES or FFA=0 in step 163, the FF 114 of the loop detector DCL is reset in step 165. If NO or FFA=1 in step 163, the FF 114 is set in step 166. Thereafter, the flow advances to step 167 as in the case that NO is obtained in step 161. In step 167, the FF 113 is reset. In step 169, it is discriminated if the readout operation has been performed up to the line end. When YES is obtained in step 169, the flow returns to step 133.

In response to the output signal or switching control signal DOUT obtained by the edge detection processing as described above, the image of the area AER may be recorded in black or red in units of scanning lines. It is, of course, possible not to record in correspondence with the image data within the area AER. Thus, trimming or overlay may be performed by drawing a blue loop LP on the original MAT or the original cover COV. Even if there is a part missing in the loop or a reading error, the area may be specified by approximation.

In the description of the embodiment made above, the discrimination of the specified area by the loop LP is made on the basis of the subscanning compressed data DCS. However, the discrimination of the specified area may be performed on the basis of the blue data DBU without performing data compression. In this case, edge detection is performed by directly supplying the blue data DBU to the first line memory ML1.

Figure 16:
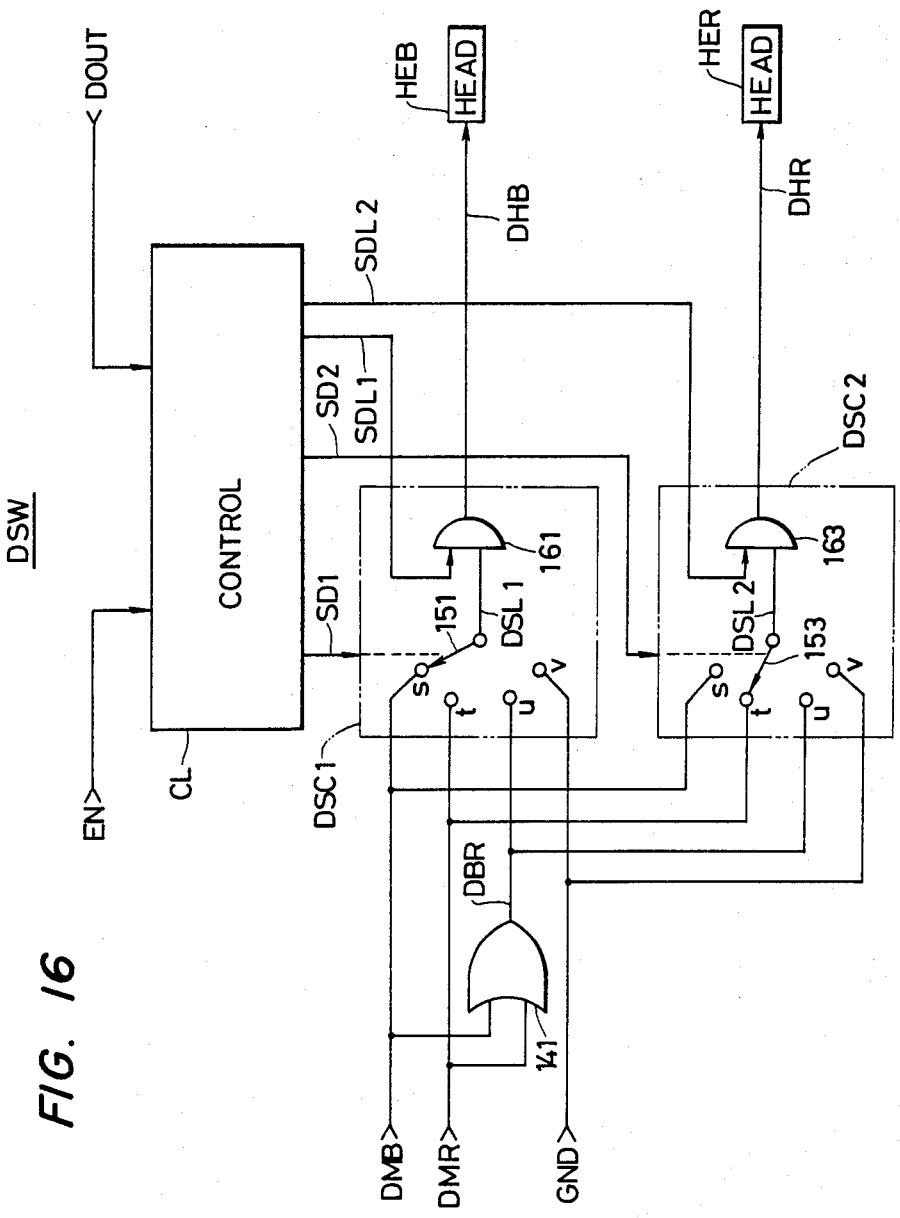
FIG. 16 is a block diagram of the first example of a data switching circuit.

FIG. 16 shows an example of the data switching circuit DSW shown in FIG. 2. The output signal or the switching control signal DOUT and an enable signal EN input from the console panel are supplied to a control CL of the data switching circuit DSW. The control CL outputs a first data selection signal SD1, a second data selection signal SD2, a first logic signal SDL1 and a second logic signal SDL2. Black readout data DMB and red readout data DMR are supplied to an OR gate 141 which produces a logic sum signal DBR. The black readout signal DMB, the red readout signal DMR the logic sum signal DBR from the OR gate 141, and zero data GND equal to ground potential are supplied to contacts s, t, u and v of change-over switches 151 and 153 of first and second data selection circuits DSC1 and DSC2, respectively. Logic signals SDL1 and SDL2 from the AND change-over switches 151 and 153 are supplied to AND gates 161 and 163, respectively. Only when the logic signal SDL1 or SDL2 is at high level, the black data DHB or the red data DHR is output from the AND gate 161 or 163.

Assume that the image of the area AER surrounded by the blue loop LP alone is recorded in normal color printing. In response to the enable signal EN, the control CL outputs the data selection signals SD1 and SD2 so as to connect the change-over switch 151 at the side of the contact s and to connect the change-over switch 153 to the side of the contact t. In response to the output signal or the data switching control signal DOUT, the control CL outputs the logic signals SDL1 and SDL2 which go to high level only during the interval TZK for edge detection of each line. Thus, in accordance with the edge data DE, the image of the area AER of the original is recorded for each line and the image outside the area AER is not recorded even though the black readout data DMB and the red readout data DMR are available.

Now assume that the image on the original is recorded all in black including the red portions of the original inside and outside the area AER. In this case, the change-over switch 151 is connected at the side of the contact u, while the change-over switch 153 is connected at the side of the contact v. Then, the black recording head HEB is driven by the black data DHB from the AND gate 161 to record in black. On the other hand, since the zero data GND is supplied to the AND gate 163, the red recording head HER is not driven. By controlling the control CL to produce the logic signal SDL1 of high level constantly, the image of the original MAT is recorded in black inside and outside the area AER.

If the control CL is controlled so as to produce the logic signal SDL1 which goes to high level only within the interval TZK of the edge data DE, only the image inside the area AER can be recorded in black and red.

The color conversion as described above may be performed in a similar manner in the case of a color conversion from black to red. In this case, the change-over switch 151 is connected at the side of the contact v so as not to drive the black recording head HEB. At the same time, the change-over switch 153 is connected at the side of the contact u to record in red.

It is also possible to record black portions of the original MAT in red and the red portions of the original in black. In this case, the change-over switch 151 is connected at the side of the contact t, and the change-over switch 153 is connected at the side of the contact s. Then, in accordance with the input red data DMR, the black recording head HEB is driven. In accordance with the black data DMB, the red recording head HER is driven. In this manner, recording in black and red with mutual color conversion may be performed. In this case, it is also possible to perform color conversion inside or outside the area AER by controlling the logic statuses of the logic signals SDL1 and SDL2.

Different color conversions may be performed inside and outside the area AER surrounded by the blue loop LP. In this case, the control CL produces the first logic signal SDL1 of high level and the second logic signal SDL2 of low level. The change-over switch 151 is connected at the side of the contact t, while the change-over switch 153 is connected at the side of the contact s. Then, within the area AER, the black recording head HEB is driven in accordance with the black data DHB from the AND gate 161 which receives the red readout data DMR. Outside the area AER, the red recording head HER is driven in accordance with the red data DHR from the AND gate 163 which receives the black readout data DMB. In this manner, color conversion from black to red is performed outside the area AER, while color conversion from red to black is performed inside the area AER.

It is also possible to prohibit reproduction of only a particular color. For example, the change-over switch 151 is connected at the side of the contact s, and the change-over switch 153 is connected at the side of the contact v. Then, only the black recording head HEB is driven in accordance with the black readout data DMB, and the red readout data DMR is cut off. In order to cut off the red readout data only outside the area AER, the second logic signal SDL1 is made to go to high level only during the interval TZK for edge detection. In this case, the change-over switch 151 is connected at the side of the contact s, and the change-over switch 153 is connected at the side of the contact t. Thus, inside the area AER, the black recording head HEB is driven in accordance with the black readout data DMB, and the red recording head HER is driven in accordance with the red readout data DMR. However, outside the area AER, the red readout data DHR is cut off, and only the black recording head HEB is driven in accordance with the black readout data DMB. Thus, only outside the area AER, is recording in red prohibited.

In the embodiment described above, the printing colors of the original MAT black and red. However, in the case of an original including three or more colors other than black and red, each color is identified as one of red, black and blue by approximation. Therefore, if the loop LP is to be drawn in blue, the original MAT must not include a blue portion.

In the embodiment described above, edge detection is performed on the basis of the blue data DNU. However, edge detection and area specification may be performed on the basis of data of a different color. Furthermore, the color for edge detection is not limited to one color which is blue in the embodiments described above. For example, data compression and edge detection may be performed on the basis of data of another color (e.g., red data DRE). Thus, image processing for recording may be performed on the basis of a plurality of colors. For example, it is convenient to record in black the part surrounded by the blue loop and to record in red the part surrounded by the red loop. It is also possible not to record a blue loop and to record the area surrounded by a red loop by color conversion (e.g., recording of a white and black original in red). This may be performed by controlling the data switching circuit DSW in accordance with the data switching control signal DOUT. When areas are to be specified by blue and red in this manner, the printing colors of the original MAT must be colors other than blue and red.

Figure 17A:
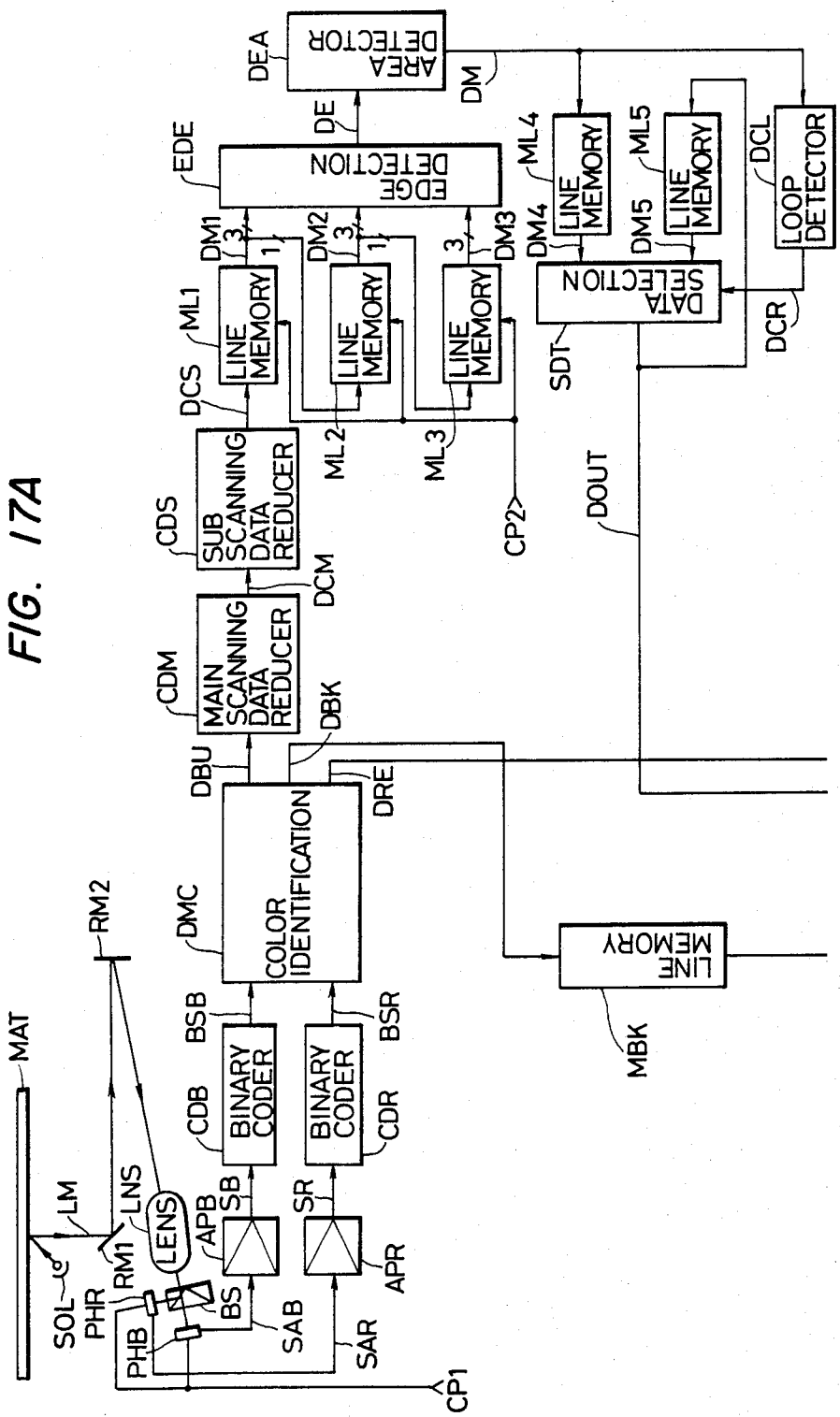
FIGS. 17A and 17B are block diagrams of an image processing apparatus according to the second embodiment of the present invention.
Figure 17B:
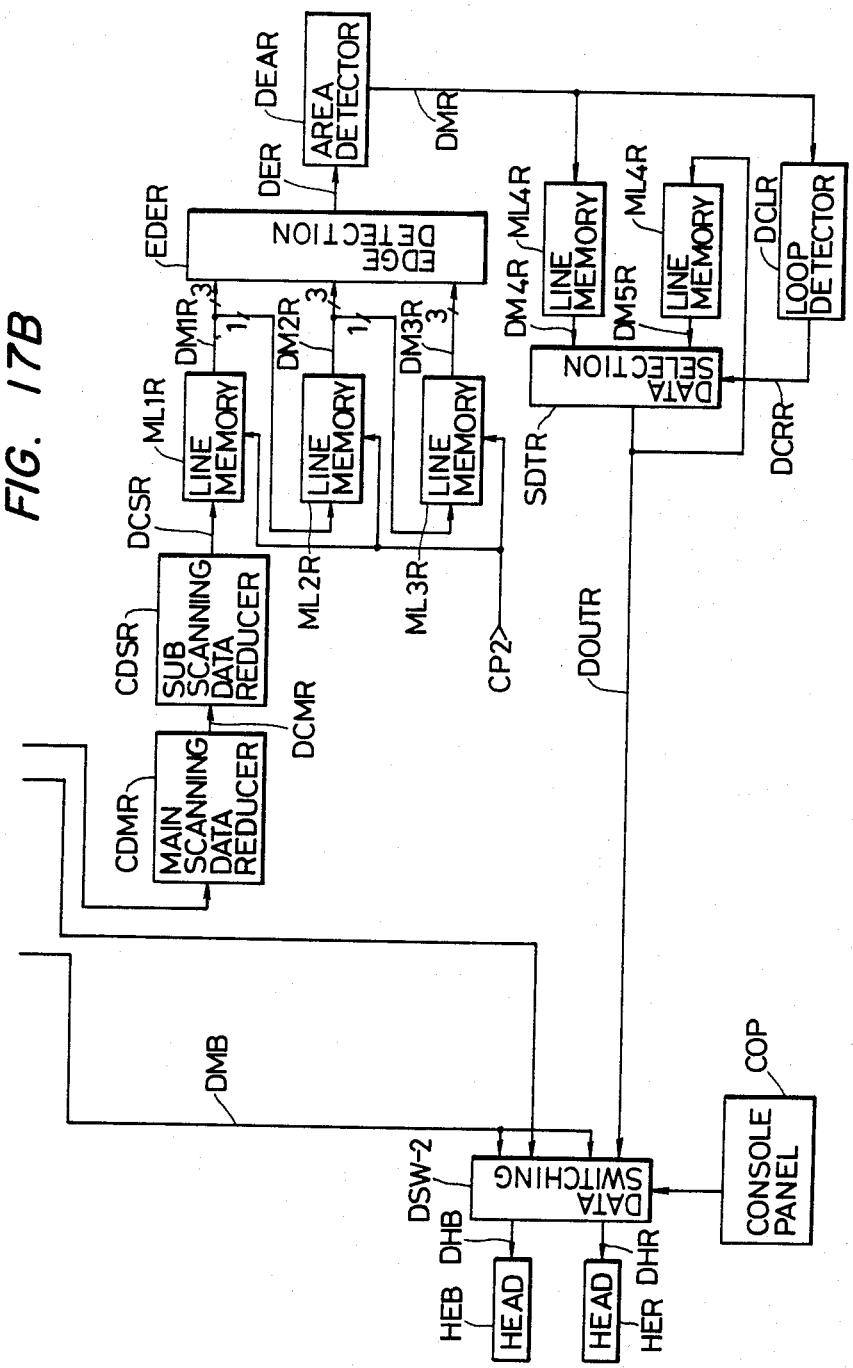

FIG. 17 shows an image processing apparatus according to the second embodiment of the present invention which allows specification of areas in two colors. The device shown in FIG. 17 is basically the same as that shown in FIG. 2 except that a circuit same as that for performing edge detection based on the blue data DBU from the color detector DMC so as to obtain the output signal DOUT is incorporated also for processing the red data DRE; and another control DOUTR is provided. The individual circuits for performing edge detection of the red data DRE are shown by the same reference numerals with a symbol "R". Since edge detection is performed in a similar manner as in the case of the former embodiment, a description thereof will not be made.

Figures 18, 19:
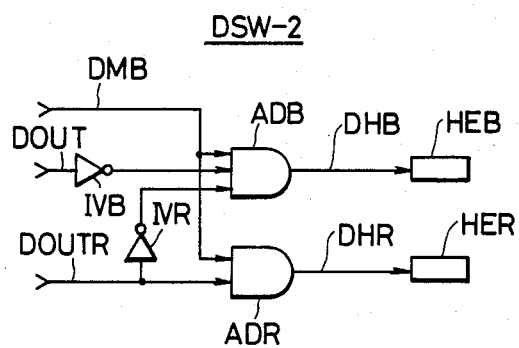
FIG. 18 is a block diagram of the second example of a data switching circuit.
FIG. 19 is a table showing input/output statuses of the circuit shown in FIG. 18.

FIG. 18 shows a data switching circuit DSW-2. The output signal DOUT obtained by edge detection of the blue data DBU is supplied to an AND gate ADB through an inverter IVB. Another output signal or switching control signal DOUTR obtained by edge detection based on the red data DRE is supplied to another AND gate ADR as well as to the AND gate ADB through an inverter IVR. The readout data DMB from the line memory MBK is supplied to these AND gates ADB and ADR. The black data DHB from the AND gate ADB is supplied to the black recording head HEB. The red data DHR from the AND gate ADR is supplied to the red recording head HER. FIG. 19 shows the table of logic statuses of the signals DOUT and DOUTR, and the data DHB and DHR.

Figure 20:
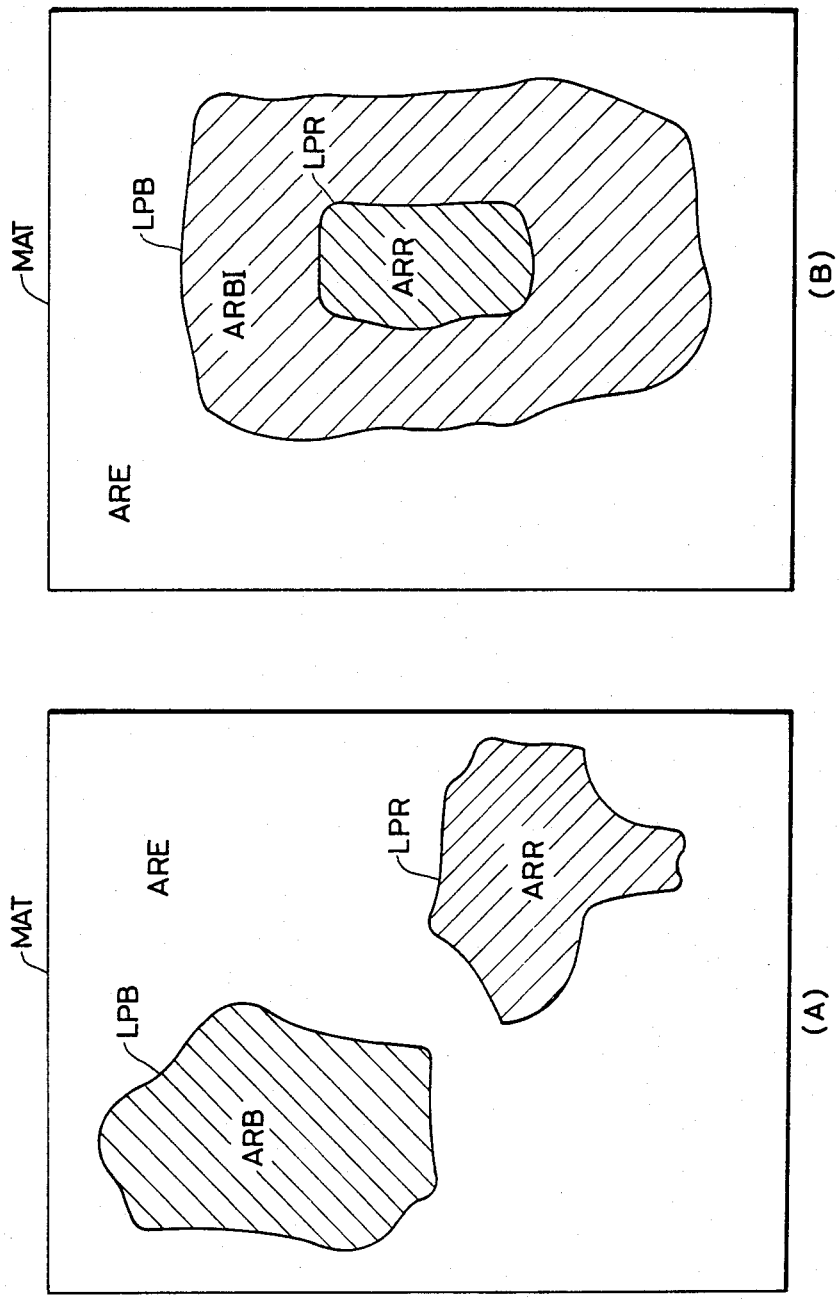
FIG. 20 is views showing originals with specified areas.

FIGS. 20(A) and 20(B) show areas of the original MAT specified in two colors. As shown in FIG. 20(A), an area ARB is specified by a blue loop LPB, and an area ARR is specified by a red loop LPR. The remaining area of the original MAT is referred to as an area ARE. For performing area specification as shown in the drawing, the output signal DOUT is generated for the area ARB as in the case of FIG. 2, and the output signal DOUTR is generated for the area ARE. Since neither of the black data DHB and the red data DHR is available for the area ARB, recording is not performed (extinguishing mode). Since the red data DHR is generated for the area APR, recording in red is performed (red output mode 1). In this mode, recording in red is performed in accordance with the black readout data DMB in accordance with the printing color of the original MAT. For the area ARE outside the loops, recording in black is performed in accordance with the black data DHB (normal mode).

A description will now be made on the case wherein the red loop LPR is formed within the blue loop LPB. For the area ARE outside the loops, recording is performed in the normal mode. For the area ARR, recording by color conversion is performed in the red output mode 2. For an area ARB1 of the area LPB excluding the area ARR, recording is performed in the extinguishing mode.

Various combinations of these normal mode, the extinguishing mode, and the output modes may be attained by selecting the logic status of the data switching circuit DSW-2 shown in FIG. 18 by the input through the console panel COP.

In the embodiments described above, an area or areas of the original MAT is or are specified by a loop or loops. Image data inside and outside the loop or loops is converted or extinguished for achieving recording in various modes. A description will now be made on the case wherein image data from another source is inserted at a desired area of the original MAT.

Figure 21:
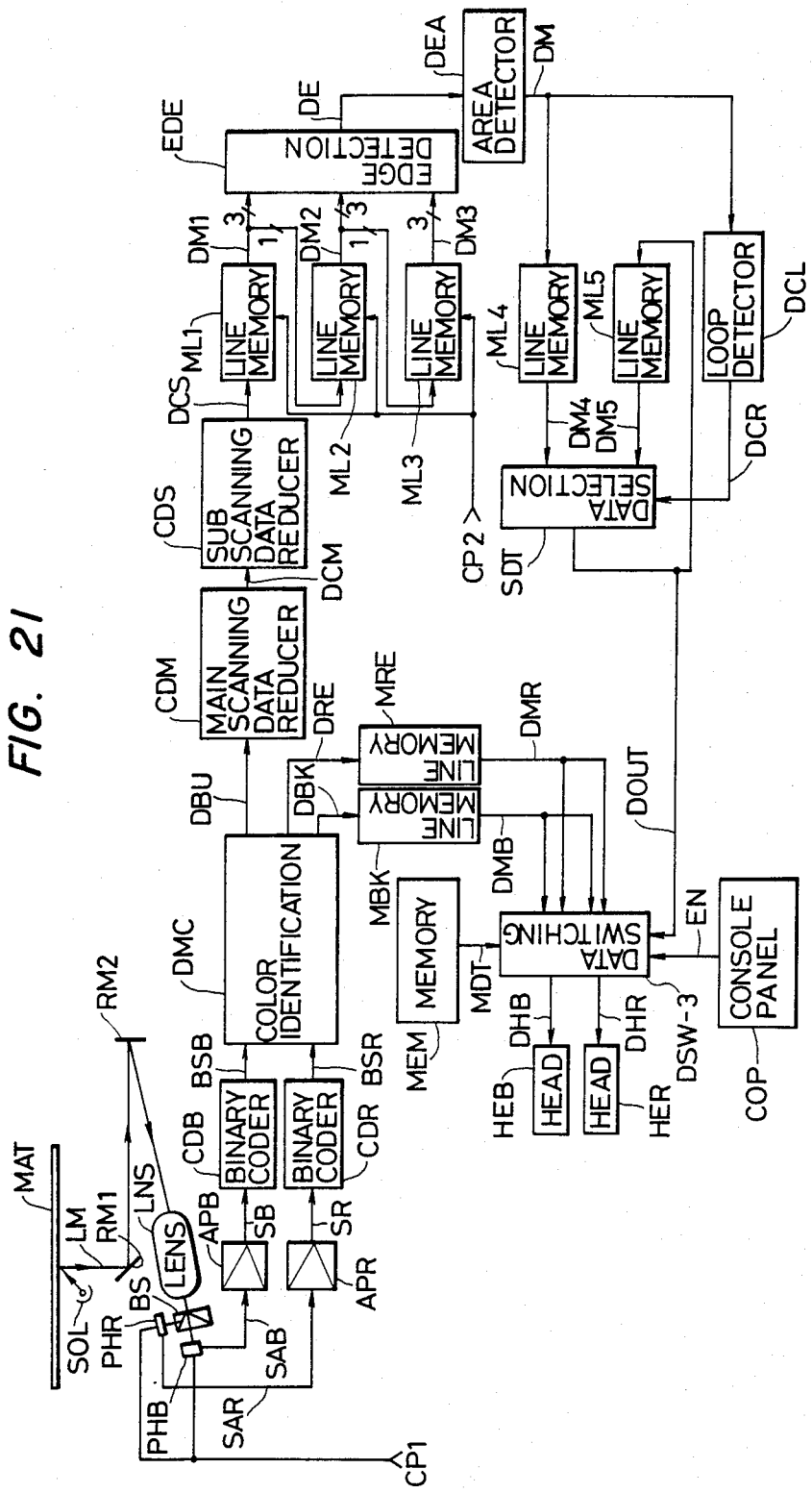
FIG. 21 is a block diagram of an image processing apparatus according to the third embodiment of the present invention.

FIG. 21 shows an image processing apparatus according to the third embodiment of the present invention. This device has additional functions to those of the device shown in FIG. 2. The additional functions are functions to read out image or character data stored in a memory MEM and to synthesize the readout data from the memory with the image data of the original MAT for recording in accordance with the area specification by the blue loop. The device shown in FIG. 21 differs from that shown in FIG. 2 in that the memory MEM for storing the image data comprising a semiconductor memory or RAM is connected to a data switching circuit DSW-3 for selectively supplying the black readout data DMB and the red readout data DMR from the line memories MBK and MRE to the black recording head HEB and the red recording head HER, respectively.

In response to the output signal DOUT from the data selector SDT and the enable signal EN from the console COP, the data switching circuit DSW-3 controls the output of the readout data DMB and DMR from the line memories and the image data MDT stored in the memory MEM.

Figure 22:
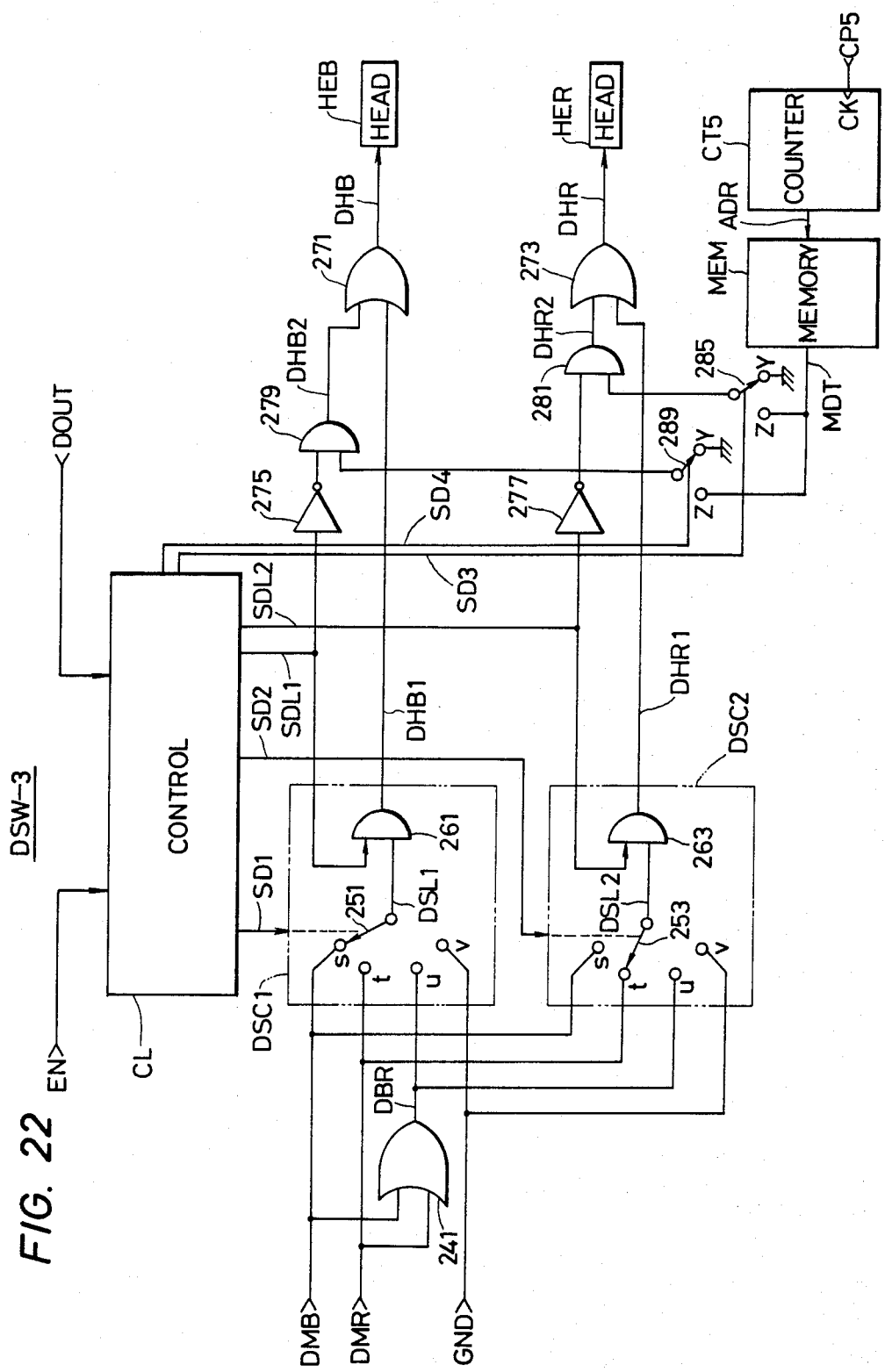
FIG. 22 is a block diagram of the third example of a data switching circuit.

FIG. 22 shows an example of the data switching circuit DSW-3 shown in FIG. 21. The same reference numerals in FIG. 22 denote the same parts of the switching circuit DSW as in FIG. 16. The data switching control signal DOUT and the enable signal EN from the console panel COP are supplied to the control CL constituting the data switching circuit DSW-3. The control CL generates the first data selection signal SD1, the second data selection signal SD2, and the first and second logic signals SDL1 and SDL2 for controlling passage of selection data. The black readout data DMB and the red readout data DMR are supplied to an OR gate 241 which produces a logic sum signal DBR. The black readout data DMB, the red readout data DMR, the logic sum signal DBR, and the zero data GND equal to ground potential are supplied to contacts s, t, u and v of change-over switches 251 and 253 of the first and second data selection circuits DSC1 and DSC2, respectively. Data DSL1 and DSL2 selected by the change-over switches 251 and 253 are respectively supplied to AND gates 261 and 263. Only when the signals SDL1 or SDL2 is at high level, the data DSL1 or DSL2 is produced from the AND gates 261 and 263 as a first black data signal DHB1 or a first red data signal DHR1. These signals DHB1 and DHR1 are supplied to one input terminal each of OR gates 271 and 273. The first and second logic signals SDL1 and SDL2 are supplied to one input terminal each of AND gates 279 and 281 through inverters 275 and 277, respectively.

A second black data signal DHB2 output from the AND gate 279 is supplied to the other input terminal of the OR gate 271, while a second red data signal DHR2 output from the AND gate 281 is supplied to the other input terminal of the OR gate 278. The OR gates 271 and 278 respectively output the black data DHB and the red data DHR.

The memory MEM stores data to be added for composite recording, for example, data obtained by the previous reading operation. The address of the memory MEM from which the data is to be read out is specified by an address signal ADR generated by a counter CT5 for counting clock pulses CP5. In response to data selection signals SD3 and SD4 from the control CL, data MDT read out from the memory MEM is supplied to the other input terminal each of the AND gates 279 and 281 through switches 288 and 285, respectively. Contacts y of the switches 288 and 285 are grounded.

In order to perform color conversion, color extinguishing or the like of the original image inside and outside the blue loop described above, the switches 283 and 285 of the data switching circuit DSW-3 are connected to the side of the contacts y. Then, the apparatus can perform the same function as that of the image processing apparatus shown in FIG. 2 regardless of the data read out from the memory MEM.

The characteristic feature of the apparatus shown in FIG. 21 will now be described. A description will be made for a case wherein the image read out from the original MAT is recorded for the area AER surrounded by the blue loop LP on the original MAT, and the data read out from the memory MEM is recorded for areas other than the area AER. For this purpose, the control CL generates the second logic signal SDL2 which is constantly at low level and the first logic signal SDL1 which goes to high level only during the interval TZK. The switch 288 is connected at the side of a contact z, and the switch 285 is connected at the side of the contact y. In this state, the data MDT is sequentially read out from the memory MEM in response to the clock pulses CP5. In durations other than the interval TZK, the data MDT is produced from the AND gate 279 as the second black data signal DHB2. The second black data signal DHB2 is supplied to the black recording head HEB for recording in black. In this case, depending on whether the switch 251 is connected at which one of the contacts s, t and u, recording in black is performed in accordance with the black data DBK, the red data DRE or the logic sum signal DBR thereof, in the interval TZK.

A description will now be made for the case for recording in red areas other than the area AER in accordance with data stored in the memory MEM. In this case, the control CL generates the first logic signal SDL1 which is constantly at low level, and the second logic signal SDL2 which goes to high level only in the interval TZK. The switch 288 is connected at the side of the contact y, and the switch 285 is connected at the side of the contact z.

In durations other than the interval TZK, the data MDT is produced from the AND gate 281 as the second red data signal DHR2. The second red data signal DHR2 is supplied to the red recording head HER for recording in red. Similarly, recording is performed according to the connecting state of the switch 258 in the interval TZK.

In order to record according to the data stored in the memory MEM in the interval TZK, the inverted signal of the first logic signal SDL1 from the inverter 275 is supplied to the AND gate 261. The inverted signal of the second logic signal SDL2 from the inverter 277 is supplied to the AND gate 268.

Figure 23:
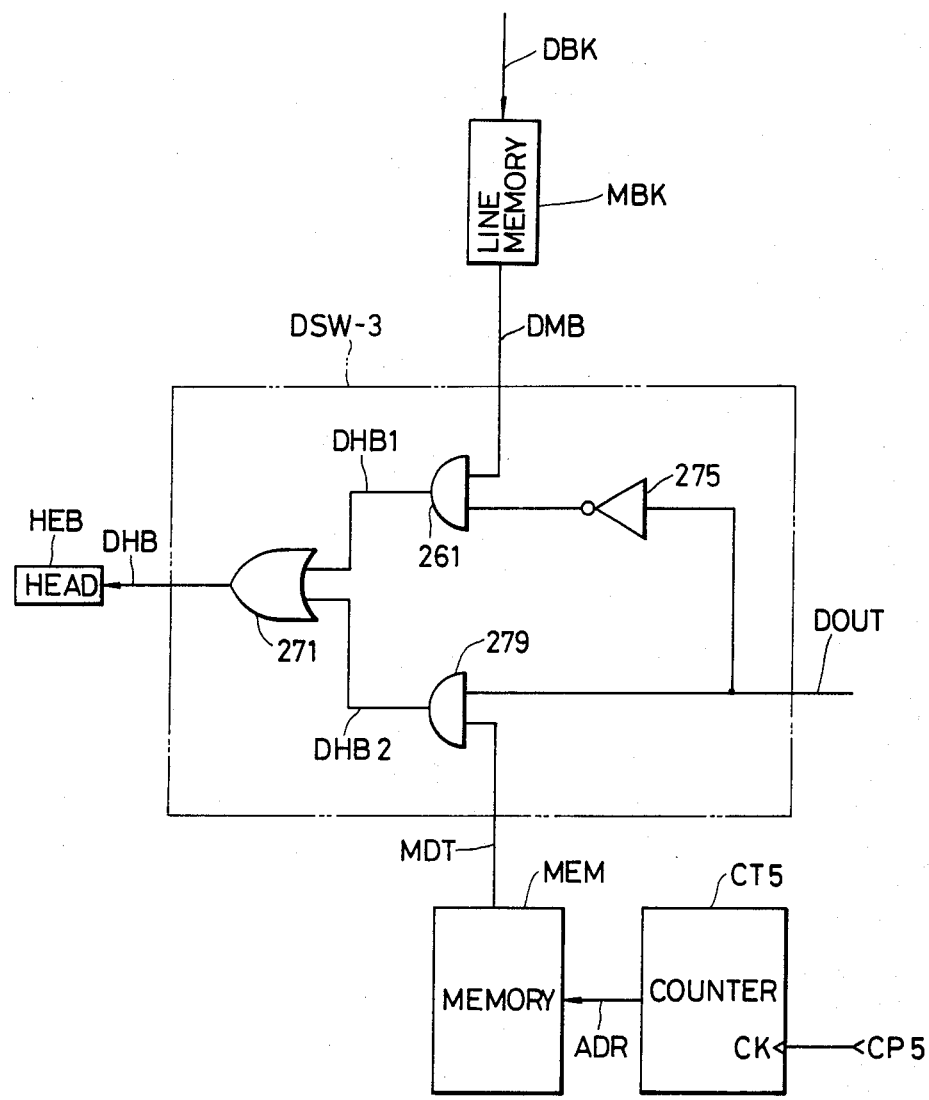
FIG. 23 is a simplified block diagram of the data switching circuit shown in FIG. 22.
Figure 24:
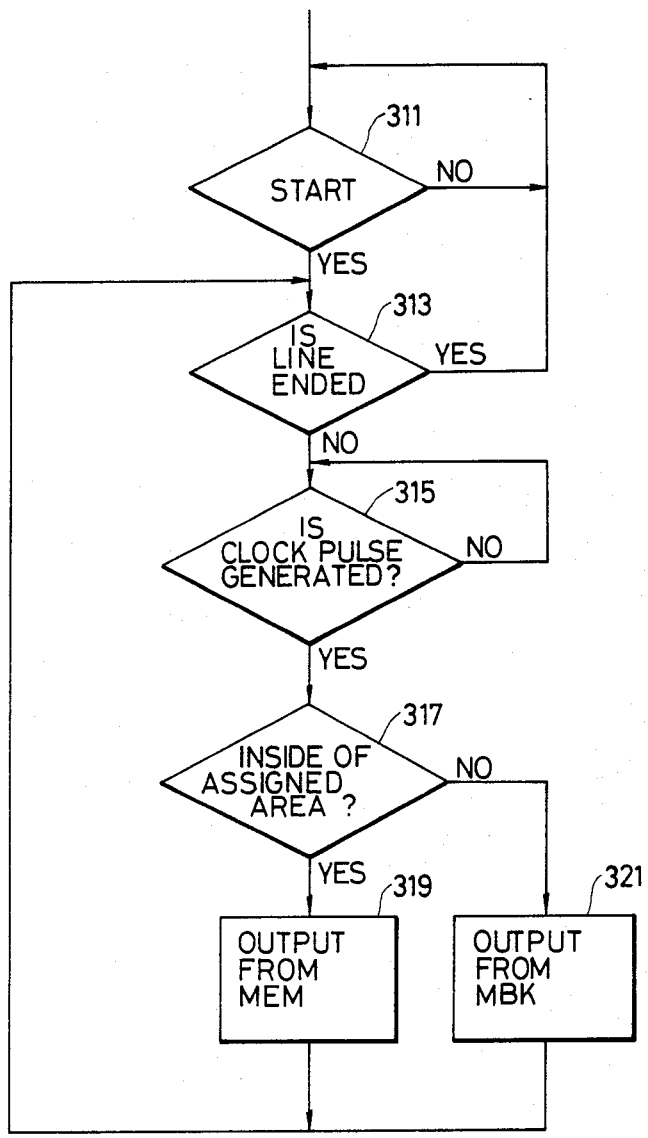
FIG. 24 is a flowchart showing the mode of operation of the circuit shown in FIG. 23.

Image processing only for recording in black involving the data stored in the memory MEM will now be described with reference to the simplified block diagram of the data switching circuit DSW-3 shown in FIG. 23 and the flowchart shown in FIG. 24.

In step 311, it is discriminated if the start command has been input. If YES in step 311, it is discriminated in step 313 if the main scanning operation has reached the original read terminal end MER1 (FIG. 3(D)) after reception of the start command. If YES in step 313, the flow returns to step 311. If NO in step 313, it is discriminated in step 315 if the clock pulses CP5 are generated. If YES in step 315, it is discriminated in step 317 if the data corresponds to the area AER. The discrimination operation in step 317 is made in accordance with the logic status of the data switching control signal DOUT. Since the data switching control signal DOUT is at high level in the interval TZK, the data MDT read out from the memory MEM is output as the black data DHB in step 319. Since the data switching control signal DOUT is at low level in durations other than the interval TZK, the inverted signal from the inverter 275 is supplied to the AND gate 261 to turn it on. Then, the black readout data DMB from the line memory MBK is output as the black data DHB in step 321. In this manner, the data stored in the memory MEM is recorded in the interval TZK, while the data read out from the line memory MBK is recorded in other durations. Thereafter, the flow returns to step 313 for repeating the above loop.

The specifying operation of the area may be performed with a simple configuration as described above. The data of the specified area may be replaced by data from another memory, or data from another memory may be added to the data of the specified area.

In the embodiment described above, the data is only replaced one by another. However, it is also possible to drive the data selection circuit DSC1 so as to supply the black readout data DMB from the line memory MBK to the OR gate 271. Then, the data stored in the memory MEM is superposed on the image of the original MAT. In this embodiment, the area need not be specified by blue but may be specified by another color such as red.

As in the case of the apparatus shown in FIG. 17, it is possible with the apparatus of this embodiment to allow discrimination of areas specified by blue and red loops and to perform difference types of image processing for each color.

The image processing apparatuses of the embodiments shown in FIGS. 2, 17 and 21 are capable of performing processing the image data read from the original MAT and recording in real time.

Figure 25:
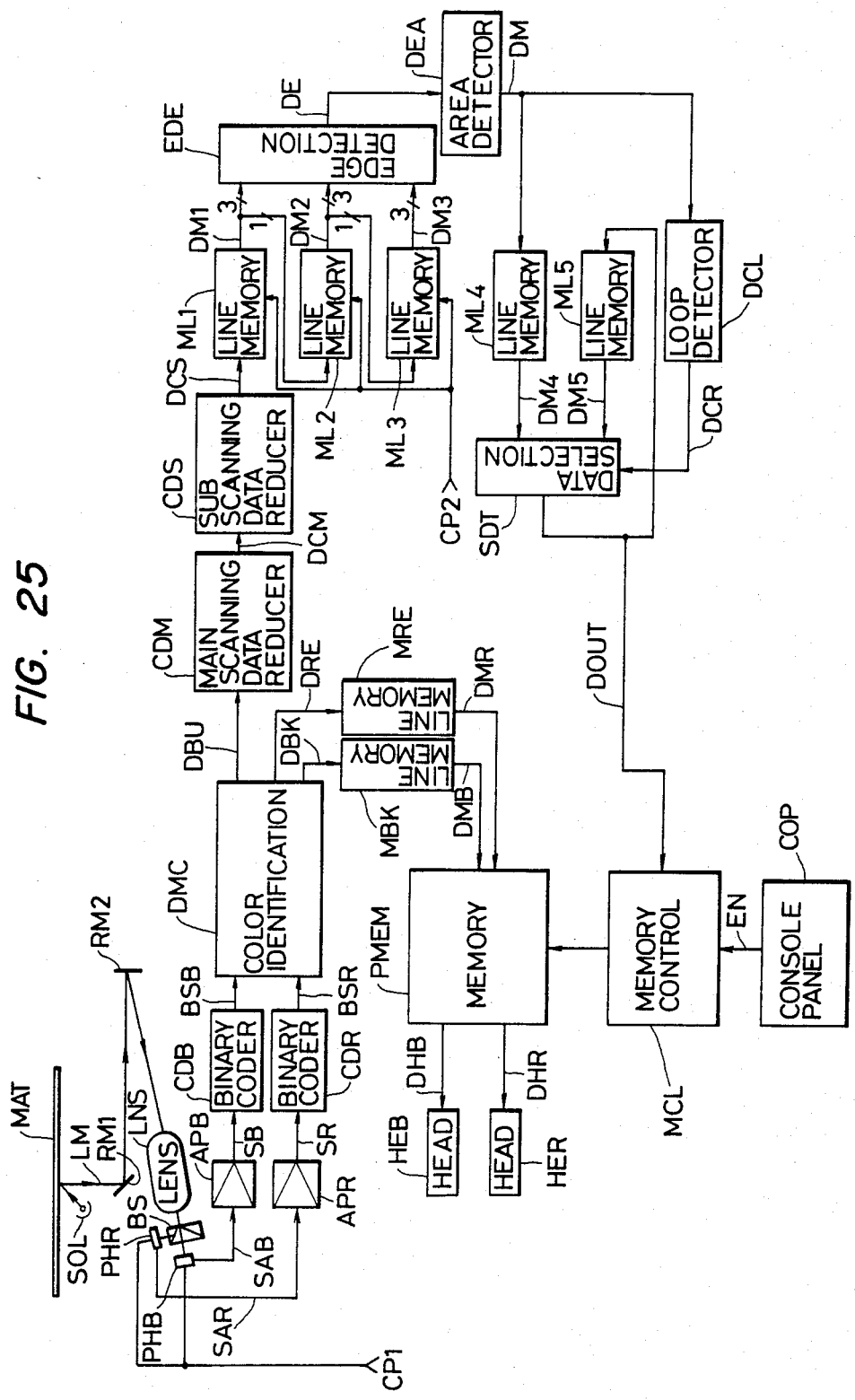
FIG. 25 is a block diagram of an image processing apparatus according to the fourth embodiment of the present invention.

FIG. 25 shows an image processing apparatus according to the fifth embodiment of the present invention for recording the image data of a desired area specified by the blue loop on the original MAT or the image data from which data of the desired area is deleted.

The apparatus shown in FIG. 25 is basically the same as that shown in FIG. 2 except that a random access memory PMEM comprising a semiconductor random access memory or a disc memory is incorporated in place of the data switching circuit DSW, and a memory control MCL for controlling read/write operations of the memory PMEM in accordance with the output signal DOUT from the data selection circuit SDT is incorporated.

As has been described above, the data of the area specified by the blue loop is output as the output signal DOUT from the data selector SDT together with the image of the original MAT.

In order to control the write operation of the memory PMEM, the output signal DOUT is supplied to the memory control MCL as well as to the fifth line memory ML5. The output signal DOUT is kept stored in the fifth line memory ML5 during the scanning interval of the next scanning line.

The black data DBK from the color identification circuit DMC is supplied to the line memory MBK, while the red data DRE is supplied to the line memory MRE. The data stored in these line memories MBK and MRE are read out in response to the clock pulses. The black readout data DMB from the line memory MBK and the red readout data DMR from the line memory MRE are supplied to the memory PMEM and are written therein under the control of the memory control MCL. Thus, the data of the area specified by the blue loop on the original MAT is stored in the memory PMEM.

The data stored in the memory PMEM is read out therefrom under the control of the memory control MCL and is output as the black data DHB or the red data DHR in accordance with the command input through the console panel COP.

It is also possible to store the image outside the specified area as well as the image of the specified area. For this purpose, in response to the data switching control signal DOUT obtained by edge detection described with reference to FIG. 15, the data inside the area AER may be stored in the memory PMEM for each line. It is also possible to store the data outside the area AER in the memory PMEM. Image processing such as trimming or overlay may be performed by reading out the data stored in the memory PMEM. Such processing may be performed by only drawing a blue loop LP on the original MAT. Even if there is a missing part in the loop or a reading error, the area may be specified by approximation.

In this embodiment, discrimination of the area specified by the blue loop LP is performed in accordance with the subscanning compressed data DCS. However, this may alternatively be performed on the basis of the blue data DBU. In this case, the blue data DBU is directly supplied to the first line memory ML1 for edge detection.

Figure 26:
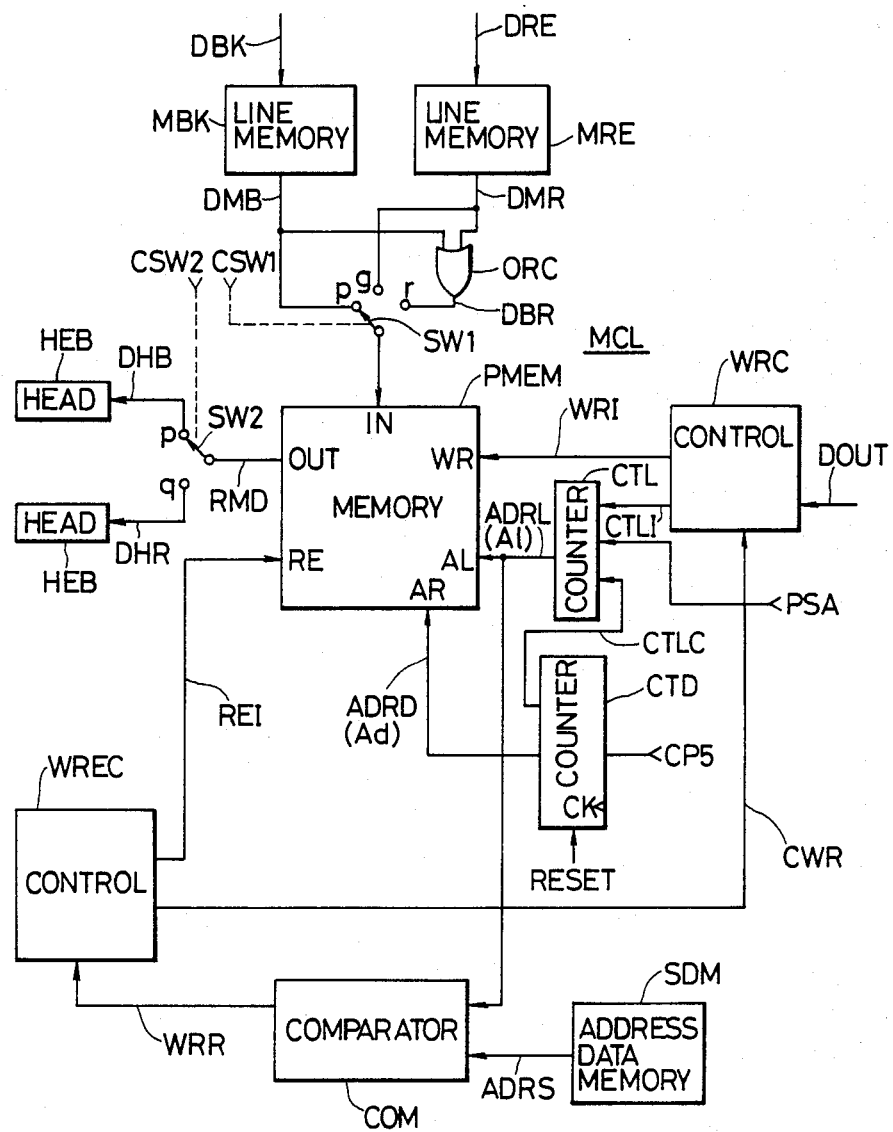
FIG. 26 is a block diagram of examples of a memory and a memory control.

FIG. 26 shows examples of the memory PMEM and the memory control MCL in FIG. 25. The control signal DOUT from the data selector SDT is supplied to a control WRC. The black readout data DMB from the line memory MBK and the red readout data DMR from the line memory MRE are supplied to an OR gate ORC which outputs the logic sum signal DBR. The black readout data DMB, the readout data DMR, or the logic sum signal DBR is supplied to the memory PMEM through a change-over switch SW1. The memory PMEM comprises a random access memory which has a capacity sufficient to store all the image data of the original MAT. The memory PMEM has memory elements arranged in a Mm x Mn matrix. The row address of the memory PMEM is specified by a signal ADRD output from a counter CTD of Mn-base, for example, which counts the clock pulses CP5. The clock pulses CP5 are synchronous with the clock pulses for the data read operation from the line memories MBK and MRE. The column address of the memory PMEM is specified by a signal ADRL output from a counter CTL of Mm-base, for example, for counting carry signals CTCL for the counter CTD.

In response to a write instruction signal WRI from the control WRC, the readout data DMB, DMR or DBR is stored in the memory element of the memory PMEM accessed according to the column and row addresses specified in the manner as described above. The data stored in the specified memory element is output in response to a read instruction signal REI from the control WREC. Data RMD read out from the memory PMEM is output as the black data DHB or the red data DHR in accordance with the switching operation of a change-over switch SW2 and is supplied to the associated recording head.

In response to a signal CWR from the control WREC output in the write mode, the control WRC generates a write instruction signal WRI only if the control signal DOUT is at high level. In the read mode, the control WREC can generate the read instruction signal REI. In response to a release signal WRR from the comparator COM, the control WREC prohibits the read and write operations of data from and in the memory PMEM. In response to an enable signal CTL1 from the control WRC, the counter CTL can operate in either the write mode or the read mode.

Figure 27:
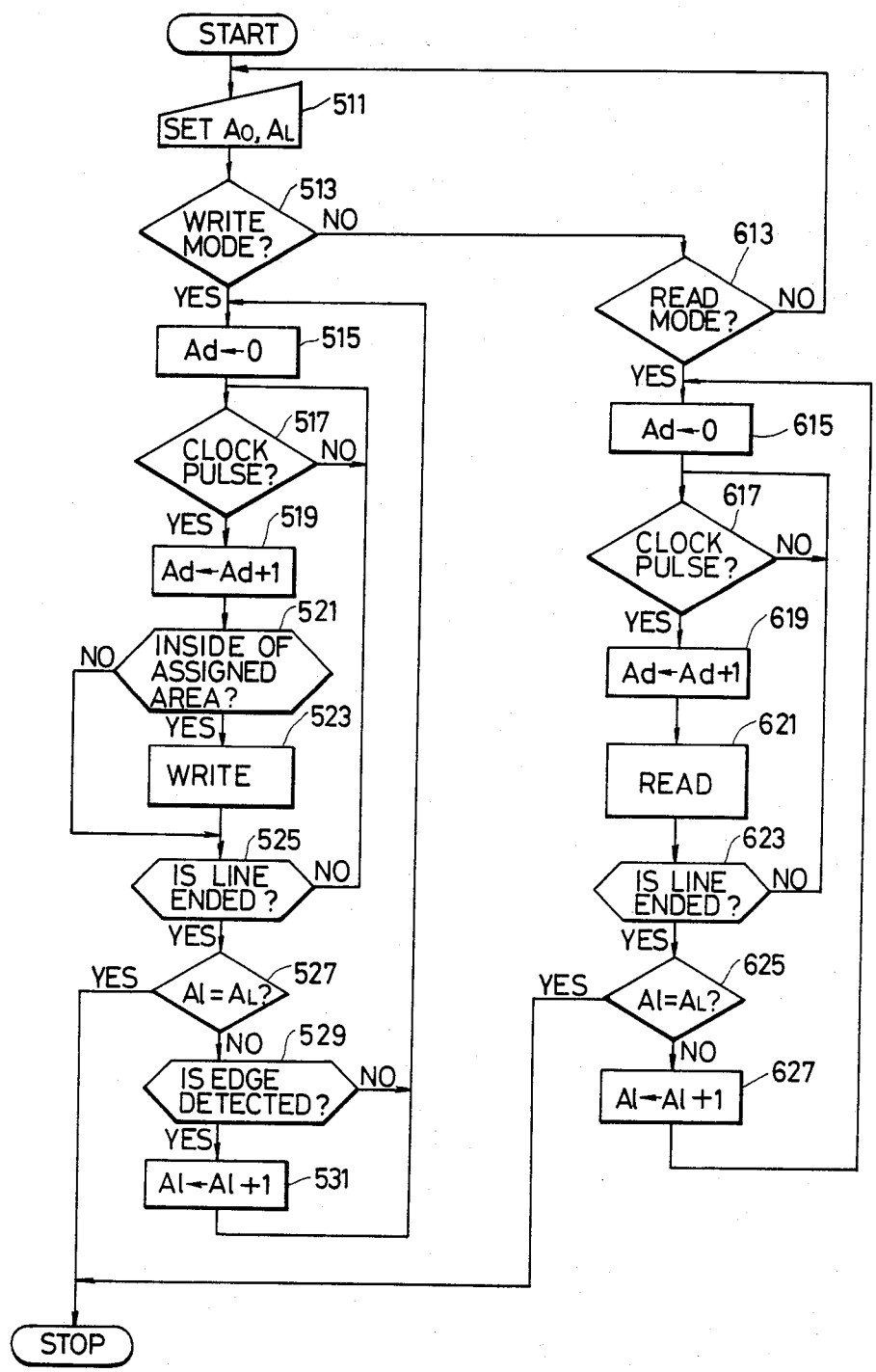
FIG. 27 is a flowchart showing the mode of operation of the circuitry shown in FIG. 26.

FIG. 27 shows a flowchart for explaining the mode of operation of the apparatus shown in FIG. 26. Referring to FIG. 27, the write/read mode is set and, a start address A0 and an end address AL for the read/write operation are initially set at the console panel COP in step 511. The start address A0 is preset in the counter CTL by a setting signal PSA. The end address AL is stored in an address data memory SDM. A signal ADRS representing the end address AL is supplied to the comparator COM. The switch SW1 is connected to the side of a contact p by a switch change-over signal CSW1 so as to write the black readout data DMB in the memory PMEM.

After the initial setting, the set mode is discriminated in step 513. If YES in step 513, the counter CTD is reset to make zero a row address signal ADRD at a row address terminal AR of the memory PMEM as well as a row address Ad in step 515. It is then discriminated in step 517 if the clock pulses CP5 are generated. In response to the clock pulse CP5, the counter CTD is counted up by one to increment the row address Ad by one in step 519.

It is discriminated in step 521 if the control signal DOUT is at high level. If YES in step 521, the data is within the area AER. If NO in step 521, the data is outside the area AER. If YES in step 521, the control WRC generates the write instruction signal SRI. In step 523, the black readout data DMB is stored in the memory element of the memory PMEM which is specified by a column address Al represented by the column address signal ADRL from the counter CTL and a column address Ad represented by the row address signal ADRD from the counter CTD. Then, the flow advances to step 525. If NO in step 521, the flow advances to step 525 wherein it is discriminated if the line end has been reached or the original read terminal end MER1 (FIG. 3(D)) has been detected. This may be achieved, for example, by making a maximum count Mn of the counter CTD to coincide with the main scanning bit number (1728) and by checking if the row address Ad has reached 1728. If NO in step 525, the flow returns to step 517 to repeat the loop described above. When YES is obtained in step 525, the flow exits the loop and goes to step 527. In step 527, it is discriminated if the column address Al represented by the column address signal ADRL coincides with the end address AL set in step 511. This discrimination is performed by comparing the signal ADRL with the signal ADRS by the comparator COM. If NO in step 527, it is discriminated in step 529 if the edge data DE is detected in the main scanning line. This discrimination is performed in the manner to be described below. A flag is set if step 523 is performed even once. Then, it is discriminated in step 529 if the flag is in the set status. The flag must be reset in step 515. If YES in step 529, the carry signals CTLC from the counter CTD are counted to increment the column address Al in step 531. The flow then returns to step 515. If NO in step 529, the flow returns to step 515 without incrementing the column address Al. In this case, generation of the carry signals CTLC from the counter CTD is prohibited so as to render the counter CTL inoperative. Alternatively, after counting the signals CTLC, the count of the counter CTL may be counted down through detection of absence of the counter CTL. In this case, the counter CTL must be an up/down counter.

Figure 28:
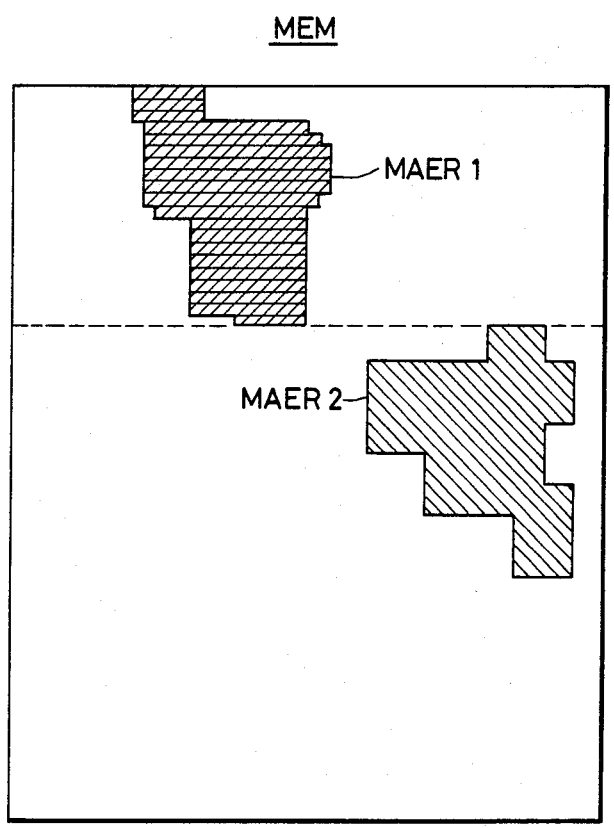
FIG. 28 is a view showing how data is stored in the memory.

When the flow returns to step 515, the row address Ad is set to zero and the similar operation as described above is performed for the next main scanning line. When this sequence loop is performed up to the write end address AL, YES is obtained in step 527, and the release signal WRR is generated by the comparator COM to complete the write operation. In this manner, the black readout data of the image within the area AER specified by the blue loop LP on the original MAT is stored in a memory element area MAER1 of the memory PMEM as shown in FIG. 28.

For an area which is specified by another blue loop at a distance from the above blue loop in the subscanning direction on the original MAT, data is stored in the memory PMEM in the same manner. However, in this case, it is discriminated in step 529 if the column address Al must be incremented through the presence or absence of the edge data. Therefore, even if there is a distance between the specified areas, the black data is stored in a memory element area MAER2 having column addresses next to those of the area MAER1 as shown in FIG. 28.

In order to write the red readout data DMR or the composite data of the black and red readout data DMB and DMR in the memory PMEM, the change-over switch SW1 is switched to the side of a contact q or r by the switch change-over signal CSW1. In order to store data of areas other than the specified area AER, it suffices to supply an inverted signal of the control signal DOUT to the control WRC.

A description will now be made for reading out the data stored in the memory PMEM and for recording with the corresponding inkjet head. The change-over switch SW2 is connected at the side of the contact p for recording in black, and the change-over switch SW2 is connected at the side of the contact q for recording in red, respectively, by the switch change-over signal CSW2.

In step 511, the read mode, the read start column address A0, and the read end column address AL are initially set. As in the case of the write mode, the address A0 is preset in the counter CTL, and the address AL is stored in the address data memory SDM. In step 613, it is discriminated if the mode is the read mode. Then, in step 615, the counter CTD is reset to make the row address Ad zero. It is discriminated in step 617 if the clock pulse CP5 is generated. In synchronism with the clock pulse CP5, the row address Ad is incremented in step 619. The read instruction signal REI is generated by the control WREC to read out the data stored at the address of the memory PMEM specified by the column address Al and the row address Ad in step 621. Thus, the stored data is read out in response to the clock pulse CP5. The readout data RMD is supplied to the head HEB or HER for recording in black or red. It is discriminated in step 623 if the line end has been reached. If NO in step 623, the flow returns to step 617 and the above loop is repeated. When YES is obtained in step 623, the flow goes out of this loop and goes to step 625. In step 625, it is discriminated if the column address Al has reached the address AL. If NO in step 625, the column address Al is incremented and the flow returns to step 615 for performing the read operation for the next line from the row address Ad=0. This loop is repeated until Al=AL. Finally, the release signal WRR is generated by the comparator COM. Then, the data stored in the memory PMEM is recorded for each line in correspondence with the column addresses.

In the embodiment described above, the original MAT is printed in black and red. However, if an original of three or more colors other than black and red is used, each color is regarded as one of red, black and blue by approximation. Therefore, if the loop LP is a blue loop, the original MAT must not contain a portion of a color which may be regarded as blue.

In the embodiment described above, edge detection is performed on the basis of the blue data DBU. However, edge detection and area specification may be performed on the basis of another color. The image processing need not be based on blue alone but may be performed on a plurality of colors (e.g., red data DRE) by performing data compression and edge detection for other colors with the circuit configuration as shown in FIG. 17.

In the image processing apparatuses of the embodiments shown in FIGS. 2, 17, 21 and 25, the desired area of the original MAT is specified by drawing a loop.

A description will now be made of another method for specifying a desired area. First, a method for specifying an area by drawing blue L-shaped marks Ml, M2 and M3 in correspondence with the desired area will now be described. These L-shaped marks may be directly drawn on the original or may be drawn on the original cover COV as has been described with reference to FIG. 4(b).

Figure 29:
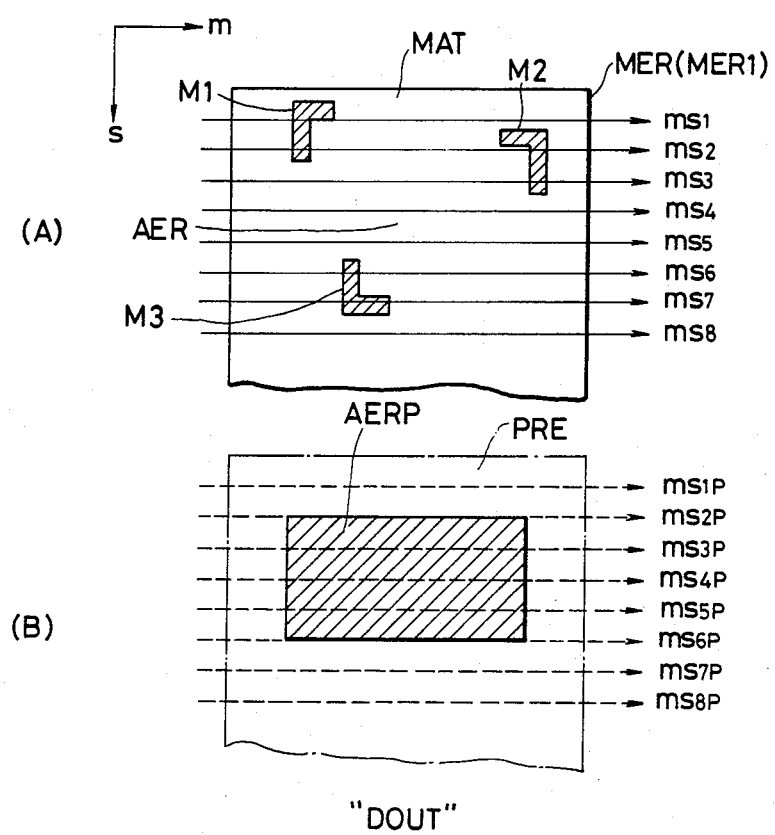
FIG. 29 shows originals with specified areas and discrimination results of the areas.
Figure 30:
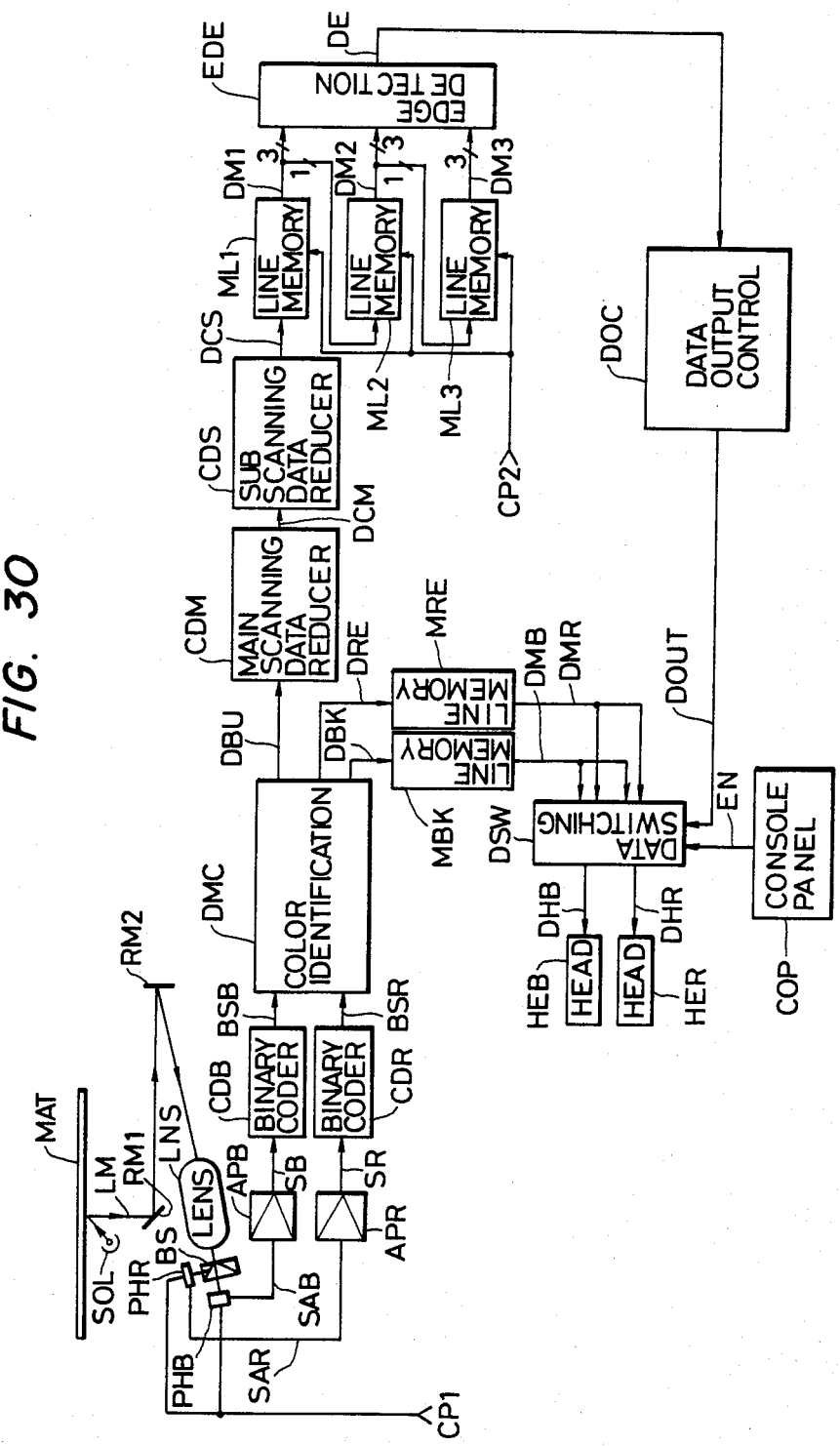
FIG. 30 is a block diagram of an image processing apparatus according to the fifth embodiment of the present invention.

FIG. 30 shows an image processing apparatus according to the fifth embodiment of the present invention. The original MAT is of A4 size and is printed in red and black. The area AER is specified by drawing three L-shaped marks Ml, M2 and M3 on the original MAT as shown in FIG. 29(A). The mark M1 corresponds to an area specifying start point in the main scanning direction m and in the subscanning direction s. The mark M2 corresponds to an area specifying end point in the main scanning direction m. The mark M3 corresponds to an area specifying end point in the subscanning direction s. The original MAT with the specified area is illuminated with light from the light source SOL. As in the case of the embodiments described above, the reflected light LM from the original is reflected by the first and second reflecting mirrors RM1 and RM2 and becomes incident on the beam splitter BS through the imaging lens LNS.

This beam splitter transmits blue light of short wavelength, and reflects red light of long wavelength. Blue light from the beam splitter BS becomes incident on the photoelectric transducer PHB, while red light becomes incident on the photoelectric transducer PHR. These photoelectric transducers PHB and PHR comprises a plurality of linearly arranged photoelectric transducer elements such as CCDs. The photoelectric transducer PHB detects the intensity of blue light, and the photoelectric transducer PHR detects the intensity of red light. The blue signals SAB and the red signals SAR time-serially output from the photoelectric transducers PHB and PHR in response to the clock pulses CP1 are supplied to the amplifiers APB and APR, respectively. The amplified blue signals SB are binary coded into the binary blue signals BSB by the binary coder CDB and are then supplied to the color identification circuit DMC. Similarly, the amplified red signals SR are binary coded into the binary red signals BSR by the binary coder CDR and are supplied to the color identification circuit DMC. In accordance with the binary blue signals BSB and the binary red signals BSR, the color identification circuit DMC performs color identification and outputs the blue data DBU, the red data DRE, and the black data DBK. The three pieces of data DBU, DRE and DBK are obtained from the left edge (read start edge) of the original MAT to the right edge MER (read end edge MER1) for each main scanning line.

Discrimination of the area specified by these L-shaped marks M1, M2 and M3 is performed on the basis of the blue data DBU. As in the case of the discrimination of the blue loop in the apparatus shown in FIG. 2, noise reduction is performed first to allow area discrimination even if the blue data DBU contains noise. The blue data DBU is first supplied to a main scanning data compressor CDM which produces main scanning compressed data DCM. The main scanning compressed data DCM is supplied to a subscanning data compressor CDS for further data compression which produces subscanning compressed data DCS. The subscanning compressed data DCS is sequentially stored in a first line memory ML1 in response to clock pulses CP2. Readout data DM1 (3-bit data) read out from the first line memory ML1 in response to the same clock pulses CP2 is supplied to an edge detector EDE while at the same time one bit thereof is supplied to a second line memory ML2. The second line memory ML2 also sequentially stores the readout data DM1 (1-bit) in response to the clock pulses CP2. Readout data DM2 (3-bit data) read out from the second line memory ML2 in response to the clock pulses CP2 is also supplied to the edge detector EDE, and one bit threof is supplied to a third line memory ML3. The readout data DM2 is stored in the third line memory ML3 and readout data DM3 (3-bit data) is read out therefrom in response to the clock pulses CP2. The readout data DM3 is supplied to the edge detector EDE.

The edge of the area AER specified by the blue L-shaped marks M1, M2, and M3 or the edge data is detected by the edge detector EDE on the basis of the three time-serial pieces of readout data DM1, DM2 and DM3. The detected edge data DE is supplied to a data output control DOC which produces an output signal DOUT representing the area AER for each main scanning line ms. The original is also scanned in the vertical direction or in subscanning lines ss. As shown in FIG. 29(B), the output signals DOUT of main scanning lines ms1P to ms8P represent an area AERP on a recording paper sheet PRE in correspondence with the area AER on the original MAT.

The black data DBK from the color identification circuit DMC is stored in a line memory MBK and the red data DRE therefrom is stored in another line memory MRE. Two pairs of readout data DMB and DMR from these line memories DMB and DMR are supplied to the data switching circuit DSW. The data switching circuit DSW supplies black data DHB to a black recording head HEB or red data DHR to a red recording head HER in accordance with the output signal or the data switching control signal DOUT from the data selector SDT and an enable signal EN for specifying a desired mode input through a console COP. The black recording head HEB is an inkjet head for recording in black, and the red recording head HER is an inkjet head for recording in red. In accordance with the black data DHB and the red data DHR, these heads HEB and HER jet the ink to form a black and red image on a recording paper sheet (not shown) in correspondence with the image data at the area specified by the blue loop on the original MAT.

The line memories MBK and MRE are incorporated to synchronize the output of the image data of each scanning line with the data processing for obtaining the data switching control signal by data compression and edge detection.

The configurations and modes of operation of the color identification circuit DMC, the main scanning data compressor DCM, the subscanning data compressor DCS, and the edge detector EDE are the same as those described with reference to FIG. 1 and will not be described again.

Figure 31:
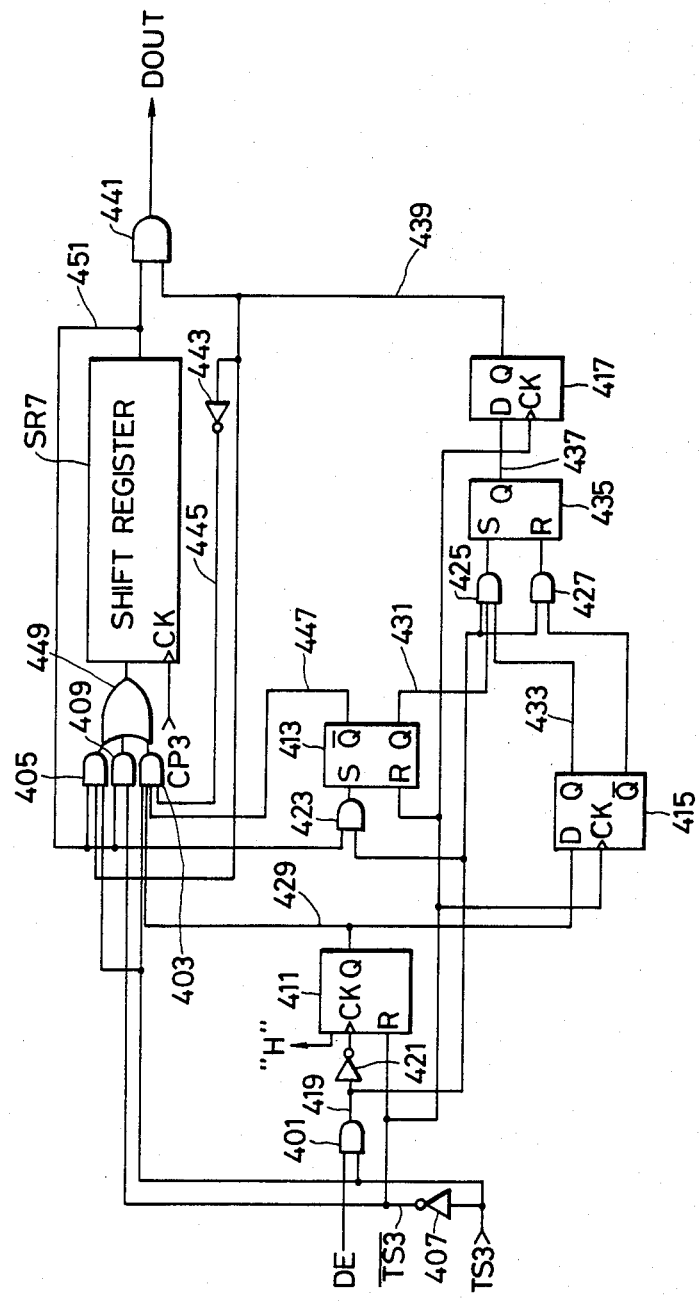
FIG. 31 is a block diagram showing an example of a data output control.
Figure 32:
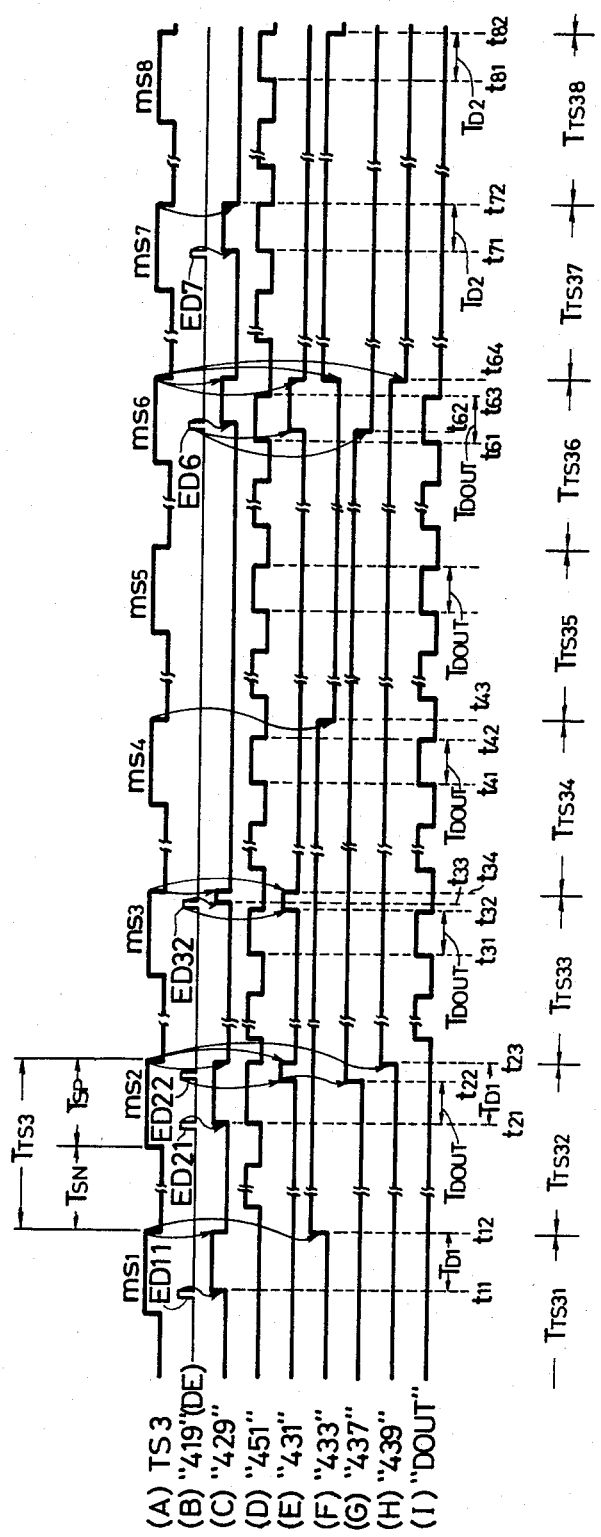
FIG. 32 shows signal waveforms for explaining the mode of operation of the circuit shown in FIG. 31.

FIG. 31 shows an example of the data output control DOC shown in FIG. 30. The third time signal TS3 from the subscanning data compressor CDS is supplied to AND gates 401, 403 and 405, and to an inverter 407. An inverted signal $\overline{TS3}$ from the inverter 407 is supplied to an AND gate 409 as well as to reset input terminals R of an FF 411 and an R-S flip-flop (to be referred to as an RSFF hereinafter) 413. The inverted signal $\overline{TS3}$ is also supplied to the clock input terminals CK of FFs 415 and 417.

The edge data DE from the edge detector EDE is supplied to the AND gate 401. An output signal 419 from the AND gate 401 is supplied to the clock input terminal CK of the FF 411 through an inverter 421 as well as to AND gates 423, 425 and 427. The D input terminal of the FF 411 is kept at high level, and its Q output signal 429 is supplied to the D input terminals of the AND gates 403 and the FF 415. Q output signals 431 and 433 from the FFs 413 and 415 are supplied to the AND gate 425. An output signal from the AND gate 425 is supplied to another RSFF 435 as a set signal. The $\overline{Q}$ output signal from the FF 415 is supplied gate 427 is supplied to the RSFF 435 as a reset signal. A Q output signal 437 from the RSFF 435 is supplied to the D input terminal of the FF 417, and a Q output signal 439 from the FF 417 is supplied to AND gates 405 and 441. The Q output signal 439 is also supplied to an inverter 443 which produces an inverted signal 445. The inverted signal 445 and a $\overline{Q}$ output signal 447 from the RSFF 413 are supplied to the AND gate 403. A logic sum signal from an OR gate 449 which receives the output signals from the AND gates 403, 405 and 409 is supplied to a 216-bit shift register SR7 in response to the clock pulse CP3. A readout signal 451 from the shift register SR7 is supplied to the AND gates 441, 405, 409 and 423 in response to the clock pulses CP3. The data switching control signal DOUT for controlling the area specifying operation is obtained from the output signal of the AND gate 441.

FIGS. 32A to 32I show signal waveforms at the respective parts of the apparatus shown in FIG. 31. The interval TTS2 of the third time signal TS3 shown in FIG. 32A corresponds to a time interval (to be referred to as the subscanning interval) of 12 main scanning lines ms. One main scanning line corresponds to the interval TSP wherein the pulse is generated, and 11 main scanning lines correspond to the interval TSN wherein the pulse is not generated. In FIG. 29A, lines $ms_1$ to $ms_8$ are shown. However, the 12th main scanning line in each subscanning interval is indicated as $ms_1$ to $ms_8$. A description will be made with reference to FIGS. 29, 31 and 32.

As the initial state, assume that all FFs are in the reset state. In the interval TSN for performing main scanning of 11 lines within a first subscanning interval TTS31, the AND gate 409 is enabled by the inverted signal $\overline{TS3}$ of the third time signal TS3. In response to the clock pulse CP3, the data stored in the shift register SR7 is read out, in response to the clock pulse CP3, as the output signal 451 which is loaded in the shift register SR7 again through the AND gate and the OR gate 449. This data transfer is performed 11 times for 11 lines. In the interval TSN within the first subscanning interval TTS31, the Q output signal 439 from the FF 417 is at low level, so the AND gate 405 does not produce an output signal. Since the Q output signal 429 from the FF 411 is also at low level, the AND gate 403 does not produce an output signal.

In the interval TSP for the 12th main scanning line $ms_1$ within the first subscanning interval TTS31, first edge data ED11 corresponding to the blue mark M1 is detected. The FF 411 is set at time $t_{11}$ at the trailing edge of the edge data ED11, and the Q output signal 429 from the FF 419 is kept at high level. Since the inverted signal $\overline{TS3}$ of the third time signal TS3 falls at time $t_{12}$ during scanning the line $ms_1$, the FF 415 is set. Thus, the RSFF 413 and the FF 417 are not inverted. At time $t_{12}$, the FF 411 is reset by the leading edge of the inverted signal $\overline{TS3}$.

A time interval TD1 between time $t_{11}$ and time $t_{12}$ is a time interval required for edge detection of the mark M1 to main scanning of the original read terminal end MER1 and is not an interval TDOUT representing the specified area. The Q output signal 429 from the FF 413, the $\overline{Q}$ output signal 447 from the RSFF 413, and the inverted signal 445 of the Q output signal 439 from the FF 417 are kept at high level. Thus, the output signal from the AND gate 403 is at high level. Therefore, in the interval TD1, a signal of level "1" is loaded in the shift register SR7 in response to the clock pulses CP3. In the interval TSP, since the inverted signal $\overline{TS3}$ is at low level, the AND gate 409 does not produce an output signal.

In the interval TSN corresponding to 11 lines within a second subscanning interval TTS32, since the inverted signal $\overline{TS3}$ is at high level, the AND gate 409 is enabled. Thus, the output signal 451 sequentially read out from the shift register SR7 is loaded therein again through the AND gate 409 and the OR gate 449. Thus, a signal of level "1" loaded in the shift register SR7 in the interval TD1 of the first subscanning interval TTS31 is transferred during the interval TSN of the second subscanning interval TTS32.

In the interval TSP of the 12th main scanning line $ms_2$ in the second subscanning interval TTS32, since the inverted signal $\overline{TS3}$ is at low level, the AND gate 409 is turned off. During this interval TSP, edge data ED21 is detected in correspondence with the mark M1, and edge data ED22 is detected in correspondence with the mark M2. The FF 411 is set at time $t_{21}$ at the leading edge of the edge data ED21. A logic product output signal from the AND gate 423 which receives the edge data ED22 and the output signal 451 from the shift register SR7 sets the RSFF 413. Since the Q output signal 431 from the RSFF 413 is at high level, the RSFF 435 is set by the AND gate 425 at time $t_{22}$. At time $t_{23}$ at which the scanning operation of the 12th line $ms_2$ is completed, the inverted signal $\overline{TS3}$ goes to high level to reset the FF 411 and the RSFF 413. Since the Q output signal 437 from the RSFF 435 is at high level, the FF 417 is set by the leading edge of the inverted signal $\overline{TS3}$. The output signal from the AND gate 403 goes to high level only during a duration between times $t_{21}$ and $t_{22}$, and the signal of level "1" is loaded in the shift register SR7 in response to the clock pulses CP3. The edge data ED11 and the edge data ED21 are obtained at the same time in each of the main scanning lines $ms_1$ and $ms_2$. Thus, time $t_{21}$ corresponds to the main scanning start point of the specified area AER, while $t_{22}$ corresponds to the main scanning end point of the area AER. The interval TDOUT is between time $t_{21}$ and $t_{22}$.

In the first subscanning interval TTS31, the signal of level "1" is loaded in the shift register SR7 for a duration of the interval TD1. However, since the AND gate 403 does not produce any output for a duration between time $t_{22}$ and time $t_{23}$, the loading interval of the signal of level "1" to the shift register SR7 becomes the interval TDOUT. Thereafter, the data transferred through the shift register SR7 is the signal of level "1" alone which is loaded in the interval TDOUT.

In the interval TSN corresponding to 11 lines in a third subscanning interval TTS33, the signal of level "1" loaded in the interval TDOUT is circulated through the shift register SR7 eleven times.

During scanning of a 12th main scanning line $ms_3$ in the third subscanning interval TTS33, edge data ED32 is detected in correspondence with the mark M2. The RSFF 413 is set by the leading edge of the edge data ED32 at time $t_{32}$. The FF 411 is set by the trailing edge of the edge data ED32 at time $t_{33}$. The FF 411 and the RSFF 413 are reset by the trailing edge of the third time signal TS3 at time $t_{34}$. Detection of the edge data ED32 and operation based upon this operation are not significantly related to detection of the area. Since the Q output signal 439 from the FF 417 is set at high level at time $t_{23}$, new data is not loaded again through the AND gate 403. Since the AND gate 405 is turned on by the signal 439 and the third time signal TS3, the output signal 451 from the shift register SR7 is loaded through the AND gate 405. This data transfer is performed on the basis of the signal of level "1" which is loaded in the interval TDOUT which is a predetermined duration within the second subscanning interval TTS32.

In fourth and fifth subscanning intervals TTS34 and TTS35, the data transfer as described above is performed through the AND gate 409 for 11 lines in the interval TSN. On the other hand, the data transfer is performed through the AND gate 405 for one line in the interval TSP. The mark is not present for the 12th main scanning lines $ms_4$ and $ms_5$ of the fourth and fifth subscanning intervals, so no edge data DE is detected. Therefore, the FF 415 is reset at time $t_{43}$ at which scanning of the line $ms_4$ is completed.

During scanning of the 12th main scanning line $ms_6$ in a sixth subscanning interval TTS36, edge data ED6 of the mark M3 is detected as the edge data DE. When the RSFF 413 is set and the RSFF 435 is data reset by the leading edge of the edge data ED6 at time $t_{62}$. The FF 411 is set by the trailing edge of the edge data ED6. The FF 411 and the RSFF 413 are reset at time $t_{64}$ at which scanning of the line $ms_6$ is completed. When the inverted signal $\overline{TS3}$ rises, the FF 415 is set at time $t_{64}$, and the FF 417 is reset since the signal 437 is at low level. In the interval TSP of the line ms$_6$, the data transfer through the shift register SR7 is performed only in the interval TDOUT.

During scanning a 12th main scanning line ms$_7$ in a seventh subscanning interval TTS37, edge data ED7 is obtained in correspondence with the mark M3. The FF 411 is set by the trailing edge of the edge data ED7 at time t$_{71}$. The FF 411 is reset at the trailing edge of the third time signal TS3 at time t$_{72}$. The interval TD2 between times t$_{71}$ and t$_{72}$ corresponds to a time duration required from the detection of the mark M3 to the detection of the original read terminal end MER1. Only in this interval TD2, the output signal from the AND gate 403 goes to high level. In this interval TD2, the signal of level "1" is sequentially loaded in the shift register SR7 in response to the clock pulse CP3. The signal of level "1" thus loaded circulates to the shift register SR7 through the AND gate 409 in the interval TSN in an eighth subscanning interval TTS38.

During scanning of the 12th main scanning line ms$_8$ in the eight subscanning interval TTS38, the mark is not detected as the edge data. Therefore, the FF 415 is reset by the leading edge of the inverted signal $\overline{TS3}$ at time t$_{32}$. Since the Q output signal 429 from the FF 411 is kept at low level, the output from the AND gate 403 remains at low level. Thus, during the interval TSP of the line ms$_8$, the signal of level "0" is loaded in response to the clock pulses CP3.

As shown in FIG. 32H, the Q output signal 439 from the FF 417 remains at high level only during the interval from the third subscanning interval TTS33 to the sixth subscanning interval TTS36. Therefore, only during this interval, the output signal 541 from the shift register SR7 is obtained as the data switching control signal DOUT. The main scanning line ms$_6$ in which the edge ED6 is detected represents the end point of subscanning of the area AER.

On the basis of the data switching control signal DOUT obtained by edge detection as described above, the data switching circuit DSW is switched and recording in red or black may be performed for the area AER for each line at this switching timing. It is also possible not to record any image data within the area AER, thus allowing trimming or overlay by simplying drawing the L-shaped blue marks M1, M2 and M3.

The data switching circuit DSW of FIG. 30 is the same as that shown in FIG. 2, and details thereof have been described with reference to FIG. 16. Therefore, the same description will not be made.

In the embodiment described above, the printing colors of the original MAT are black and red. However, in the case of an original including three or more colors other than black and red, each color is identified as one of red, black and blue by approximation. Therefore, if the loop LP is to be drawn in blue, the original MAT must not include a portion which will be regarded as blue in color.

In the embodiment described above, edge detection is performed on the basis of the blue data DBU. However, edge detection and area specification may be performed on the basis of data of a different color. Furthermore, the color for edge detection is not limited to one color which is blue in the embodiments described above. For example, data compression and edge detection may be performed on the basis of data of another color (e.g., red data DRE). Thus, image processing for recording may be performed on the basis of a plurality of colors. For example, it is convenient to record in black the part surrounded by the blue marks and to record in red the part surrounded by the red marks. It is also possible not to record blue marks and to record the area surrounded by red marks by color conversion (e.g., recording of a white and black original in red). This may be performed by controlling the data switching circuit DSW in accordance with the data switching control signal DOUT. When areas are to be specified by blue and red in this manner, the printing colors of the original MAT must be colors other than blue and red.

In the embodiment described above, the area AER is rectangular. However, areas of other shapes may be specified by drawing more marks. The marks are not limited to rectangular in shape and may be circular, a point, or linear in shape, as long as edge detection may be performed.

Furthermore, only two marks may be drawn to indicate the start and end points of subscanning.

Another method for specifying a desired area on an original will now be described. According to this method, an original is assumed to be of A4 size and is a black and red original. The area is specified by painting the desired are in blue.

Figure 33:
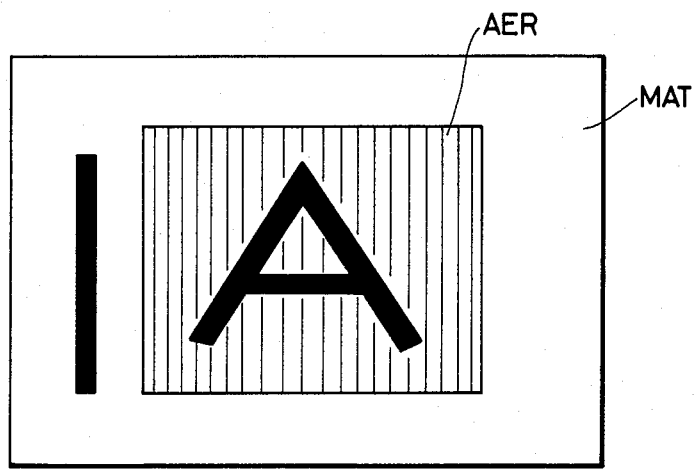
FIG. 33 is a view showing an original with a specified area.

FIG. 33 shows an example of the area specified according to this method. "1A" is written in black on the original as an image, and an area including the letter "A" is printed in blue to specify the area AER including the letter "A".

Figure 34:
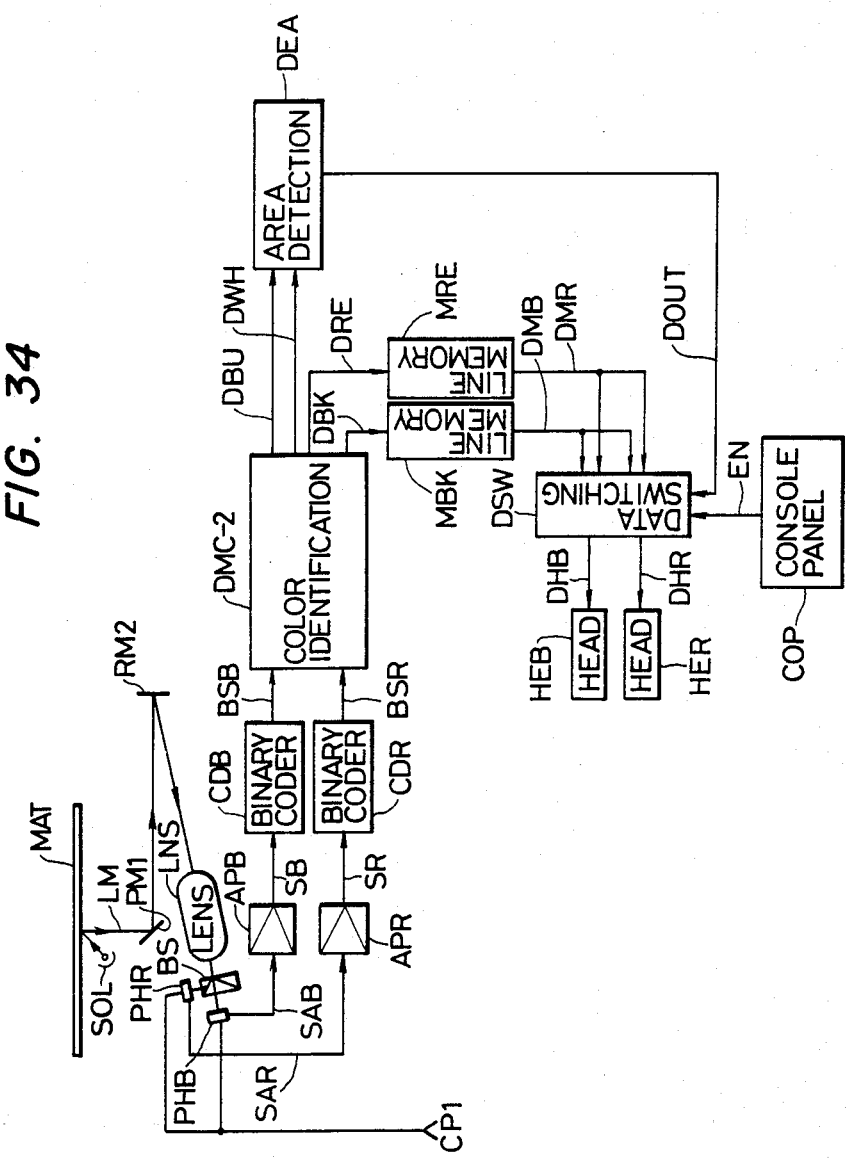
FIG. 34 is a block diagram of an image processing apparatus according to the sixth embodiment of the present invention.

FIG. 34 shows an image processing apparatus according to the sixth embodiment of the present invention for performing image processing according to the area specified by this method. The original MAT with mark data is illuminated by light emitted from a light source SOL such as a fluorescent lamp or a halogen lamp. Reflected light LM from the original MAT is reflected by a first reflecting mirror RM1 and a second reflecting mirror RM2 and then becomes incident on a beam splitter BS through an imaging lens LNS. The beam splitter BS transmits blue light of short wavelength and reflects red light of long wavelength. Blue light transmitted by the beam splitter BS becomes incident on a photoelectric transducer PHB, and red light reflected by the beam splitter BS becomes incident on a photoelectric transducer PHR. Each of these photoelectric transducers have a plurality of linearly arranged photoelectric conversion elements such as CCDs. Thus, the photoelectric transducer PHB detects the intensity of incident blue light and converts it into electric signals or blue signals SAB. Similarly, the photoelectric transducer PHR detects incident red light and converts it into red signals SAR. In response to clock pulses CP1, the photoelectric transducers PHB and PHR serially output the blue and red signals SAB and SAR to amplifiers APB and APR, respectively. A color separation filter may be used in place of the beam splitter BS.

Amplified blue signals SB from the amplifier APB are supplied to a binary coder CDB to be converted into binary blue signals BSB which are supplied to a color identification circuit DMC-2. Similarly, amplified red signals SR are supplied to another binary coder CDR to be converted into binary red signals BSR which are also supplied to the color identification circuit DMC. The color identification circuit DMC-2 performs color identification according to the binary blue signals BSB and the binary red signals BSR to generate blue data DBU, red data DRE, black data DBK and white data DWH.

The white data DWH and the blue data DBU are supplied to the area detector DEA to detect the blue area. The output signal DOUT from the area detector DEA is supplied to the data switching circuit DSW.

The black data DBK from the color identification circuit DMC-2 is stored in a line memory MBK and the red data DRE therefrom is stored in another line memory MRE. Two pairs of readout data DMB and DMR from these line memories DMB and DMR are supplied to the data switching circuit DSW. The data switching circuit DSW supplies black data DHB to a black recording head HEB or red data DHR to a red recording head HER in accordance with the output signal or the data switching control signal DOUT from the area detector DEA same as that shown in FIG. 16 and an enable signal EN for specifying a desired mode input through a console COP. The black recording head HEB is an inkjet head for recording in black, and the red recording head HER is an inkjet head for recording in red. In accordance with the black data DHB and the red data DHR, these heads HEB and HER jet the ink to form a black and red image on a recording paper sheet (not shown) in correspondence with the image data at the area specified by the blue loop on the original MAT.

The line memories MBK and MRE are incorporated to synchronize the output of the image data of each scanning line with the data processing for obtaining the data switching control signal by data compression and edge detection.

Figure 35:
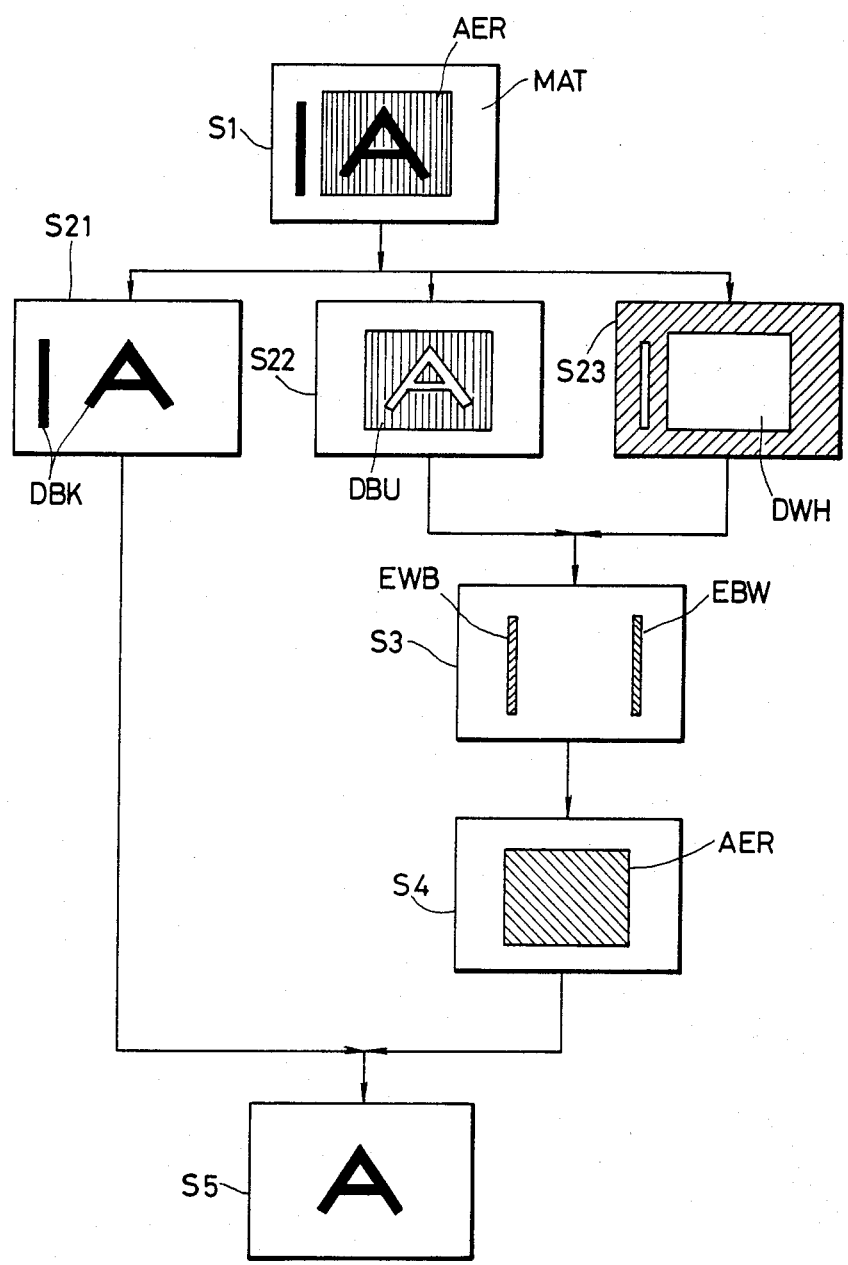
FIG. 35 is a view showing various steps of image processing by the device shown in FIG. 34.

FIG. 35 shows data in each step of image processing with the apparatus shown in FIG. 34. "1A" is written on the original in black on the original MAT, and "A" is painted in blue to specify the area AER in step S1. The image of this original is optically read and the obtained image data is supplied to the color identification circuit DMC-2 for color identification. Then, the color identification circuit DMC-2 produces the black data DBK shown in step S21, the blue data DBU shown in step S22, and the white data DWH shown in step S23. When the blue data DBK and the white data DWH are supplied to the area detector DEA, edge data EWB (FIG. 39F) turning from white to blue and edge data EBW (FIG. 39G) turning from blue to white are obtained as seen in step S3. In accordance with the edge data EWB and EBW, the blue area AER shown in step S4 is specified. With the black data DBK in step S21 and the blue area AER in step S4, the black data DBK alone within the area is recorded as seen in step S5.

Although part of the original may be directly painted in blue for specifying the area AER, this is inconvenient if the original must not be contaminated. In this case, the original may be inserted in the original cover COV consisting of transparent or semitransparent sheet member as shown in FIG. 4B, and part of the cover corresponding to the desired area of the original MAT is then painted in blue. Then, the desired area of the original MAT may be specified easily. When recording is completed, the area may be easily erased, resulting in convenience.

Figure 36:
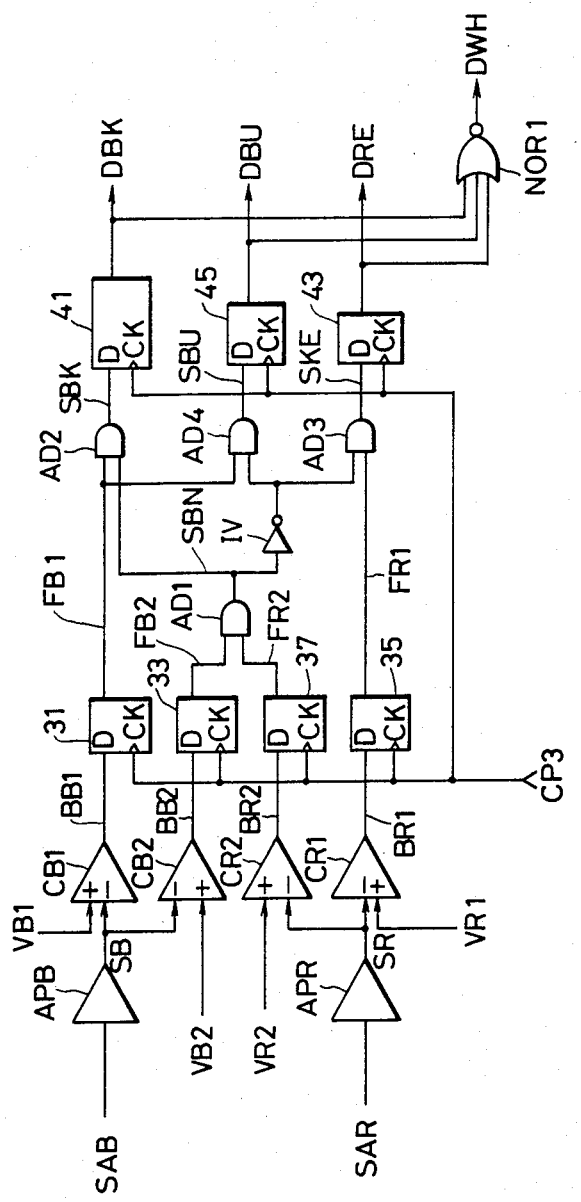
FIG. 36 is a block diagram of the second example of the color identification circuit.

FIG. 36 shows an example of a circuitry including the amplifiers APB and APR and the color identification circuit DMC shown in FIG. 34. FIG. 37A to FIG. 37L show signal waveforms at the respective parts of the circuitry shown in FIG. 36. Referring to these figures, the amplified blue signals SB are supplied to the inverting input terminals of comparators CB1 and CB2, while the amplified red signals SR are supplied to the inverting input terminals of comparators CR1 and CR2. A threshold voltage VB1 of the first slicing level close to the dark level of the blue signal level is applied to the non-inverting input terminal of the comparator CB1, and a threshold voltage VB2 of the second slicing level close to the bright level is applied to the non-inverting input terminal of the comparator CB2. Similarly, a threshold voltage VR1 of the first slicing level close to the dark level of the red signal level is applied to the non-inverting input terminal of the comparator CR1, while a threshold voltage VR2 of the second slicing level close to the bright level is applied to the non-inverting input terminal of the comparator CR2. When the signals SB and SR are at lower level than these threshold voltages, the outputs from the associated comparators go to high level. When these signals are at higher level than these threshold voltages, the outputs from the associated comparators go to low level.

Figure 37:
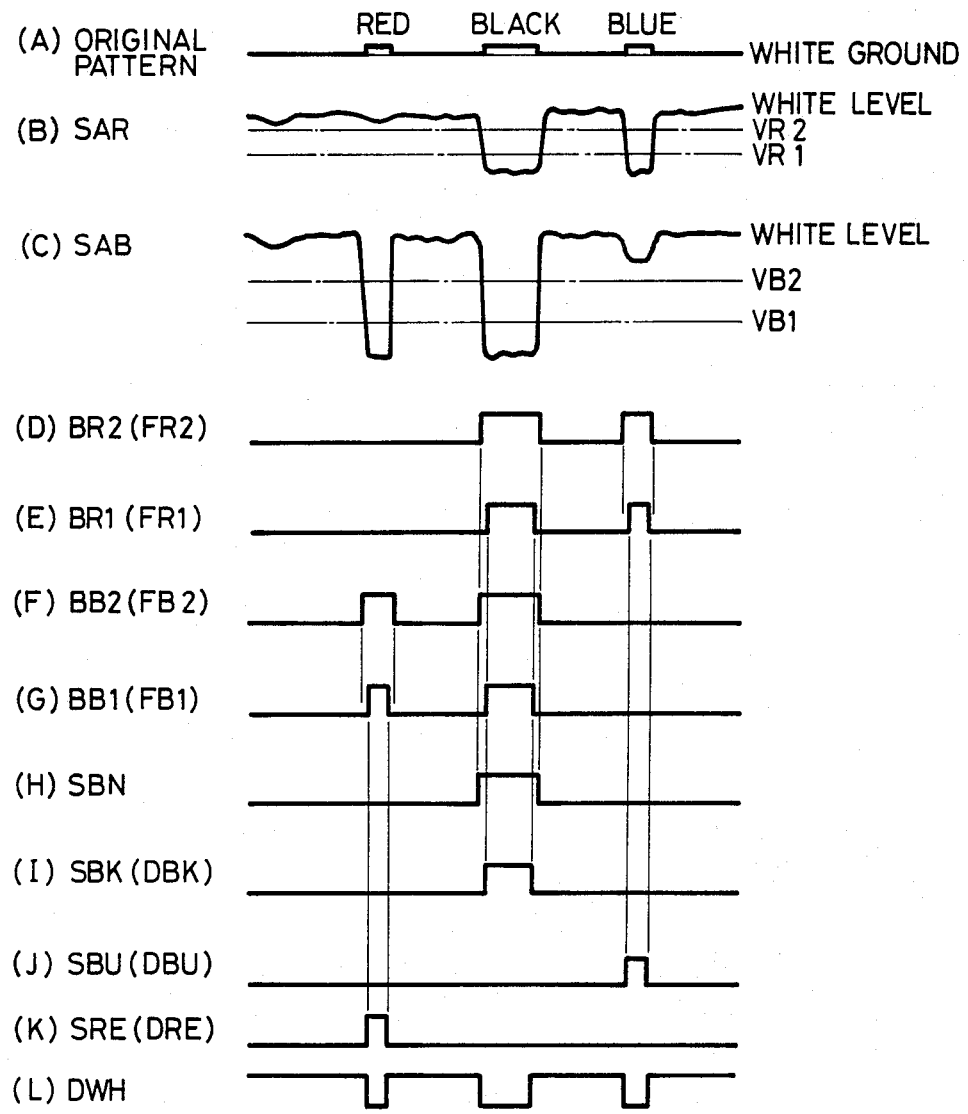
FIG. 37 shows waveforms for explaining the mode of operation of the circuit shown in FIG. 36.

Assume that the original has a pattern as shown in FIG. 37A. Since the slicing level differs from one color to another, the pulse width corresponding to the image of the original which is sliced at the first slicing level is narrower than that obtained by slicing at the second slicing level. Thus, an output signal BB1 from the comparator CB1 corresponding to a color is narrower in pulse width than an output signal BB2 from the comparator CB2 corresponding to the same color. Similarly, an output signal BR1 from the comparator CR1 is narrower in pulse width than an output signal BR2 from the comparator CR2.

The digitized output signals BB1, BB2, BR1 and BR2 are supplied to D input terminals of FFs 31, 33, 35 and 37, respectively. Clock pulses CP3 are commonly supplied to clock input terminals CK of these FFs 31, 33, 35 and 37. In response to the clock pulses CP3, the signals BB1, BB2, BR1 and BR2 are latched in the associated FFs 31, 33, 35 and 37. Signals FB1, FB2, FR1 and FR2 are output from Q output terminals of the FFs 31, 33, 35 and 37. The signals FB2 and FR2 are supplied to an AND gate AD1 which produces a black signal SBN. This black signal SBN goes to high level only in correspondence with the black portion of the image. The black signal SBN is supplied to one input terminal of an AND gate AD2. After the black signal SBN is inverted by an inverter IV, it is supplied to one input terminal each of AND gates AD3 and AD4. The signal FB1 from the FF 31 is supplied to the other input terminal each of the AND gates AD2 and AD4, and the signal FR1 from the FF 35 is supplied to the other input terminal of the AND gate AD3. The AND gate AD2 outputs a signal SBK which goes to high level only in correspondence with a black portion of the image. The AND gate AD3 outputs a signal SRE which goes to high level only in correspondence with a red portion of the image. The AND gate AD4 outputs a signal SBU which goes to high level only in correspondence with a blue portion of the image. These signals SBK, SRE and SBU are supplied to D input terminals of FFs 41, 43 and 45, respectively. The clock pulses CP3 are also supplied to the clock input terminals CK of these FFs 41, 43 and 45. In response to these clock pulses CP3, these signals SBK, SRE and SBU are latched in the associated FFs 41, 43 and 45 which respectively output the black data DBK, the red data DRE and the blue data DBU. The pieces of data DBK, DRE and DBU are supplied to a NOR gate NOR1 to provide white data DWH.

Figure 38:
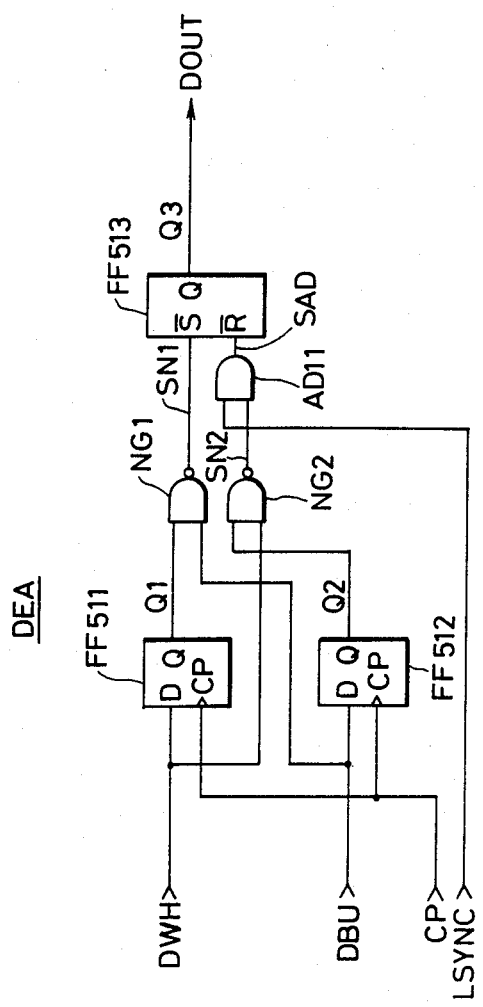
FIG. 38 is a block diagram of an example of an area detector.

FIG. 38 shows an example of the area detector DEA for detecting a blue area. The white data DWH obtained from the color identification circuit DMC is supplied to the D input terminal of an FF 511 as well as to a NAND gate NG2. The blue data DBU is supplied to the D input terminal of an FF 512 as well as to a NAND gate NG1. The output Q1 from the FF 511 is supplied to the NAND gate NG1, while the output Q2 from the FF 512 is supplied to the NAND gate NG2. A NAND output SN1 from the NAND gate NG1 is supplied to a set input terminal $\bar{S}$ of the FF 512, a NAND output SN2 from the NAND gate NG2 is supplied to one input terminal of an AND gate AD11, and a line synchronizing signal LSYNC is supplied to the other input terminal of the AND gate AD11. An AND output SAD from the AND gate AD11 is supplied to a reset input terminal $\bar{R}$ of an FF 513. Clock pulses CP are supplied to the FFs 511 and 512.

Figure 39:
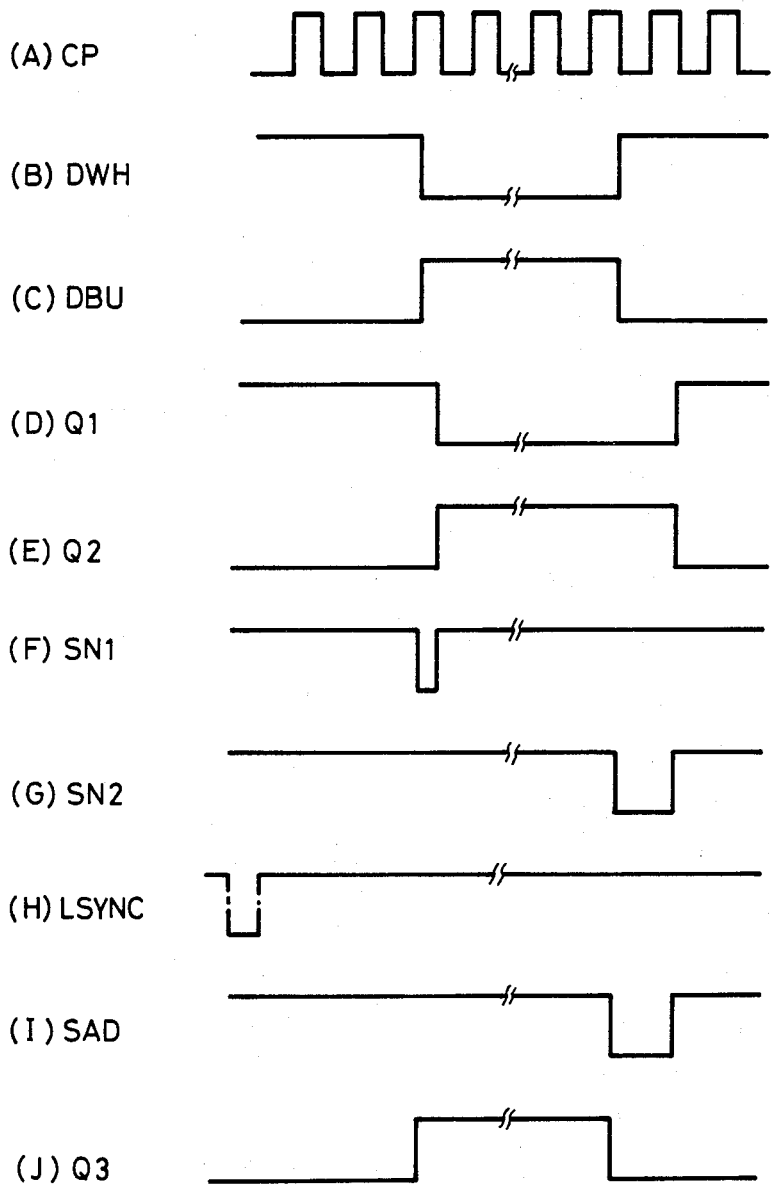
FIG. 39 shows signal waveforms for explaining the mode of operation of the detector shown in FIG. 38.

FIGS. 39A to 39J show the signal waveforms at the respective part of the area detector DEA of the configuration as described above. When the white data DWH and the blue data DBU change as shown in FIGS. 39B and 39C, the output Q4 from the FF 513 as shown in FIG. 39J is obtained. The output Q3 thus rises only in correspondence with the blue area. This output Q3 is supplied to the control CL of the data switching circuit DSW as the data switching control signal DOUT. As shown in FIG. 39H, the line synchronizing signal LSYNC rises only once for each line.

The data switching control signal DOUT obtained in this manner is supplied to the data switching circuit DSW. In response to the data switching control signal DOUT and the enable signal EN from the console panel COP, the data switching circuit DSW selectively outputs the image data input from the line memories MBK and MRE to the recording head. The data switching circuit DSW has the same configuration and function as described with reference to FIG. 16 and will not be describ again.

In the embodiment described above, the printing colors of the original MAT are black and red. However, in the case of an original including three or more colors other than black and red, each color is identified as one of red, black and blue by approximation. Therefore, if the loop LP is to be drawn in blue, the original MAT must not include a portion which will be regarded blue in color.

In the embodiment described above, edge detection is performed on the basis of the blue data DBU. However, edge detection and area specification may be performed on the basis of data of a different color. Furthermore, the color for edge detection is not limited to one color which is blue in the embodiments described above. For example, data compression and edge detection may be performed on the basis of data of another color (e.g., red data DRE). Thus, image processing for recording may be performed on the basis of a plurality of colors. For example, it is convenient to record in black the part painted in blue and to record in red the part painted in red. It is also possible not to record a blue area and to record the red area by color conversion (e.g., recording of a white and black original in red). This may be performed by controlling the data switching circuit DSW in accordance with the data switching control signal DOUT. When areas are to be specified by blue and red in this manner, the printing colors of the original MAT must be colors other than blue and red.

Although the image processing apparatuses are described with reference to inkjet recording apparatuses above, the present invention may be similarly applicable to thermal printers, stylus head printers, laser beam printers or the like.

What we claim is:

1. Image processing apparatus comprising:
   outputting means for outputting an image signal containing area specifying data;
   detecting means for detecting a duration of the image signal output by said outputting means; and
   means for discriminating the area specifying data in accordance with the duration detected by said detecting means.

2. Apparatus according to claim 1, wherein the image signal is color data of a predetermined color.

3. Apparatus according to claim 2, wherein the predetermined color is different from a color of the original to be read.

4. Image processing apparatus comprising:
   reading means for reading an image of an original containing a loop of area specifying data so as to output image signals;
   discriminating means for discriminating the area specifying data among the image signals output by said reading means; and
   image processing means for subjecting the image to image processing in accordance with the loop of area specifying data.

5. Apparatus according to claim 4, wherein said discriminating means includes color identifying means for identifying a loop of area specifying data of a predetermined color.

6. Apparatus according to claim 4, wherein said reading means includes means for color separating the image of the original.

7. Apparatus according to claim 4, wherein said image processing means performs different types of image processing inside and outside the area discriminated by said discriminating means.

8. Image processing apparatus comprising:
   reading means for reading an image of an original having an area specified with a loop of a predetermined color by scanning across the loop;
   discriminating means for discriminating color data of the predetermined color; and
   correcting means for identifying the specified area in accordance with the color data of the predetermined color by a preceding scan by said reading means if a pair of color data of the predetermined color is not discriminated by said discriminating means in a particular scan by said reading means.

9. Apparatus according to claim 8, further comprising means for storing area data according to color data of the predetermined color for at least one scanning line.

10. Apparatus according to claim 8, further comprising means for holding a discriminating state of color obtained by a scan.

11. Apparatus according to claim 8, wherein said reading means includes means for color separating a the image of the original.

, 12. An apparatus according to claim 8, further comprising image processing means for processing color data of a color other than the predetermined color.

13. Image processing means comprising:
   a member having area specifying data and facing a surface of an original;
   reading means for reading an image of the original through said member so as to output image data; and image processing means for subjecting to image processing the image data output by said reading means in accordance with the area specifying data.

14. Apparatus according to claim 13, wherein said member comprises a transparent or semitransparent sheet member.

15. Apparatus according to claim 13, wherein said member comprises two sheet members securely holding the original therebetween.

16. Apparatus according to claim 13, wherein said specifying data is a loop substantially enclosing a portion of the original image.

17. Apparatus according to claim 13, wherein said area specifying data is a plurality of marks defining a portion of the original image.

18. Apparatus according to claim 13, wherein the area specifying data is an image area painted in the predetermined color.

19. Apparatus according to claim 13, wherein said image processing means performs different types of image processing inside and outside the specified area.

20. Image processing apparatus comprising:
reading means for reading image data containing color data of an image of an original having thereon a loop of a predetermined color specifying an area of the original;
discriminating means for discriminating an area specified by the predetermined color loop from the image data read by said reading means; and
image processing means for performing different types of color image processing inside and outside the area discriminated by said discriminating means.

21. Apparatus according to claim 20, wherein said image processing means converts color data of a specific color of image data read inside or outside the specified area to color data of a different color.

22. Apparatus according to claim 20, wherein said image processing means extinguishes the color data of the predetermined color from image data read inside or outside the specified area.

23. Apparatus according to claim 20, wherein said reading means has means for color separating the image of the original.

24. Apparatus according to claim 20, wherein said image processing means processes color data of a color other than the predetermined color.

25. Image image processing apparatus comprising:
reading means for reading an image including an original image and area designating data;
discriminating means for discriminating a designated area of the original image in accordance with the area designating data;
storage means for storing image data; and
means operable by said discriminating means for producing data representing a composed image wherein the image data from said storage means is inserted in the designated area of the original image.

26. Apparatus according to claim 25 wherein said discriminating means is adapted to discriminate the designated area in accordance with area designating data defining a loop substantially enclosing a portion of the original image.

27. Apparatus according to claim 25, wherein the area designating data is a different color from that of the original image.

28. Image processing apparatus comprising:
reading means for reading an original with a plurality of area specifying data provided on the original in mutually different colors;
discriminating means for discriminating a plurality of areas on the original in accordance with said plurality of area specifying data; and
image processing means for performing different types of image processing for each of the plurality of areas discriminated by said discriminating means.

29. Apparatus according to claim 28, wherein said image processing means performs image processing of color data of a color other than the colors of the plurality of area specifying data.

30. Apparatus according to claim 28, wherein said reading means includes means for color separating the image of the original.

31. Apparatus according to claim 28, wherein the area specifying data is a loop substantially enclosing a portion of the original image.

* * * * *

UNITED STATES PATENT AND TRADEMARK OFFICE
CERTIFICATE OF CORRECTION

PATENT NO. : 4,538,182
DATED : August 27, 1985
INVENTOR(S) : SEIJI SAITO, ET AL.

Page 1 of 2

It is certified that error appears in the above-identified patent and that said Letters Patent is hereby corrected as shown below:

Column 1, line 27, change "two dimentionally" to --two dimensionally--.

Column 5, line 30, change "size) MER" to --size). MER--.

Column 7, line 35, change "comparatives" to --comparators--.

Column 14, line 42, change "AER, is" to --AER is--;
line 44, change "MAT black and red." to --MAT are black and red--; and
line 51, change "blue data DNU" to --blue data DBU--.

Column 18, line 37, change "difference types" to --different types--.

Column 22, line 63, change "comprises" to --comprise--.

Column 24, lines 44-45, change "is supplied gate 427 is supplied" to --is supplied through gate 427--.

Column 28, line 24, change "desired are" to --desired area--.

Column 31, line 36, change "describ again" to --described again--; and
line 44, before "blue" insert --as--.

Column 32, line 58, delete "a"; and
line 60, delete "," (first occurrence).

UNITED STATES PATENT AND TRADEMARK OFFICE
CERTIFICATE OF CORRECTION

PATENT NO. : 4,538,182

DATED : August 27, 1985

INVENTOR(S) : SEIJI SAITO, ET AL.

It is certified that error appears in the above-identified patent and that said Letters Patent is hereby corrected as shown below:

Column 34, line 4, delete "image", and
line 16, after "25" insert --,--.

Signed and Sealed this

Ninth Day of December, 1986

Attest:

DONALD J. QUIGG

Attesting Officer

Commissioner of Patents and Trademarks